US012811476B2

(12) United States Patent
Osari

(10) Patent No.: US 12,811,476 B2
(45) Date of Patent: Nov. 24, 2026

(54) WINDING APPARATUS FOR STATOR CORE

(71) Applicant: ODAWARA ENGINEERING CO., LTD., Kanagawa (JP)

(72) Inventor: Shunji Osari, Kanagawa (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 729 days.

(21) Appl. No.: 18/319,810

(22) Filed: May 18, 2023

(65) Prior Publication Data

US 2023/0291292 A1 Sep. 14, 2023

Related U.S. Application Data

(63) Continuation of application No. PCT/JP2021/040640, filed on Nov. 4, 2021.

(30) Foreign Application Priority Data

Nov. 19, 2020 (JP) ................................ 2020-192854

(51) Int. Cl.
*H02K 15/085* (2006.01)

(52) U.S. Cl.
CPC .................................. *H02K 15/085* (2013.01)

(58) Field of Classification Search
CPC ..... H01F 41/061; H01F 41/082; H02K 15/04; H02K 15/085
See application file for complete search history.

(56) References Cited

U.S. PATENT DOCUMENTS 5,845,863 A * 12/1998 Takubo ................ H01F 41/086 242/448
2008/0136286 A1 6/2008 Hiramatsu et al.
(Continued)

FOREIGN PATENT DOCUMENTS

JP 2008148470 A 6/2008
JP 2009055710 A * 3/2009
(Continued)

OTHER PUBLICATIONS

English translation of Written Opinion issued in Intl. Appln. No. PCT/JP2021/040640 mailed on Jan. 18, 2022. previously cited in IDS filed on May 18, 2023.
(Continued)

*Primary Examiner* — Minh N Trinh
(74) *Attorney, Agent, or Firm* — ROSSI, KIMMS & McDOWELL LLP

(57) ABSTRACT

A winding apparatus having a wire supply port, a main shaft drive structure, a holding component, a moving structure, a rotation structure, and a controller that controls the moving structure, rotation structure, and main shaft drive structure. The controller controls such that, for each rotation of a winding shaft: during diagonal winding of a wire, the holding component pushes the wire toward a wound wire side in the vicinity of a starting-point-side corner of a first region between two corners of the shaft, and the rotation structure rotates the holding component in synchronization with rotation of the shaft; after the wire is wound around an ending-point-side corner of the first region, the holding component is moved to release the pushing; and thereafter, the moving and rotation structures position the holding component in the vicinity of the starting-point-side corner before diagonal winding of a next rotation is started.

7 Claims, 16 Drawing Sheets

(56) References Cited

U.S. PATENT DOCUMENTS

| | | | | |
|---|---|---|---|---|
| 2012/0066897 | A1 | 3/2012 | Hiramatsu et al. | |
| 2023/0291292 | A1* | 9/2023 | Osari | H02K 15/04 |

FOREIGN PATENT DOCUMENTS

| | | | |
|---|---|---|---|
| JP | 2012023908 | A | 2/2012 |
| JP | 5610887 | B2 | 10/2014 |

OTHER PUBLICATIONS

International Preliminary Report on Patentability issued in Intl. Appln. No. PCT/JP2021/040640 mailed on May 16, 2023. English translation provided.

International Search Report issued in Intl. Appln. No. PCT/JP2021/040640 mailed Jan. 18, 2022. English translation provided.

Written Opinion issued in Intl. Appln. No. PCT/JP2021/040640 mailed Jan. 18, 2022.

* cited by examiner

R1
S4
18a
6
R2
R3

34(P4)
6
h1
12

18a
6
S4

K2
S4
K1
18a
6
34(P2)
34(P1)
12c

12
θ
6
34b-2
34b
34(P3)

K2
S4
K1
18a
6
34(P2)
34(P1)
12c

6
S4

R1
S4
6
R2
R3

12
θ
6
34b-2
34b
34(P3)

12
6
34(P4)

WINDING APPARATUS FOR STATOR CORE

TECHNICAL FIELD

The present invention relates to a winding method and a winding apparatus, and more particularly, to a winding method and a winding apparatus for winding a wire on a side surface of a winding shaft by supplying a wire from a wire supply port while rotating the winding shaft.

BACKGROUND

As a winding apparatus for winding a wire around a winding shaft, for example, an apparatus for performing winding around a winding shaft of a stator of an electrical rotating machine is known. Further, as a stator of an electrical rotating machine, there is known a stator having a cylindrical stator core in which a plurality of teeth (magnetic poles) projecting onto the inner radial direction and a plurality of slots opening between the teeth are radially arranged.

In such a stator, the winding is performed by winding a wire around each tooth, and stator coils formed by the winding are housed in the slots on both sides of the respective teeth. Since it is difficult to wind a wire on each tooth of the cylindrical stator core because of space constraints, it is known to perform winding for each of a plurality of segment cores of the stator core divided for each tooth and assemble each wound segment core into a ring so as to constitute the stator.

The segment core includes: a yoke piece (iron core portion) which is a segment piece of an annular yoke; and one tooth integral with the yoke piece. The tooth includes: a winding shaft having a quadrangular cross section around which a wire is wound; and a flange portion formed on the inner diameter side end portion of the winding shaft and respectively extending in the circumferential direction.

As a method of the winding on the segment core, for example, a so-called spindle winding method is known. According to this method, a segment core is fixed to a spindle such that the winding shaft thereof is concentric with the spindle and rotated while supplying a wire from a wire supply port such as a nozzle to helically wind the wire around the winding shaft.

From the viewpoint of increasing a space factor of the wire on the winding shaft, a rectangular wire having a rectangular cross section may be used as the wire. However, it is difficult to closely wind the rectangular wire in regular winding because of the corners thereof, compared with a round wire, and thus defective winding often occurs. Such defective winding is particularly likely to occur when the wire is diagonally wound from wind ending position of a previous row to the wind starting position of the subsequent row.

In order to solve this problem, PTL1 discloses a method in which a wire is wound such that a wedge-shaped gap is formed and the wire is moved away to the unwound side while pushing the wound wire by one holding component, and then the wire is pushed by another holding component so as to return the wire to the wound wire side, thereby bringing the wire of each row into close contact. Similarly, also at a position where the wire is wound diagonally, a wire is wound such that a wedge-shaped gap that becomes wider toward the downstream side is formed while pushing the wire by one holding component on the wind starting side of the position, and the wire is pushed by another holding component disposed on the wind ending side of the position so as to return the wire to the wound wire side. In the example of PTL1, two holding components are used at positions where the wire is diagonally wound, and three holding components are used at other positions.

CITATION LIST

Patent Literature

[PTL1] Japanese Patent No. 5,610,887

SUMMARY

In the case where multiple holding components are provided as in the invention disclosed in PTL1, since a configuration for independently driving these components is required, the device configuration becomes complicated and large, and the control becomes complicated, and as a result an increase in cost cannot be avoided. In addition, complication of the configuration tends to cause deterioration of reliability (winding quality) in a long term. This problem also occurs when a wire is wound around an object other than the winding axis of the segment core of the stator.

The present invention has been made in view of the above circumstances, and an object of the present invention is to simplify configuration and control of a winding apparatus, and to reduce cost of the winding apparatus and improve its winding quality.

A winding method according to the present invention is a winding method of helically winding a wire around a winding shaft by: supplying the wire from a wire supply port while rotating the winding shaft having two or more corners on a side surface thereof; and performing, in a first region between two of the corners among the side surface of the winding shaft, an diagonal winding where axial positions of the wire at a starting point and an ending point of the winding in the first region are different. Further, the winding method comprises a step for each rotation of the winding shaft, the step comprising: performing the diagonal winding while pushing the wire to a wound wire side by a holding component in vicinity of a starting point side corner of the first region; rotating the holding component in synchronization with the rotation of the winding shaft during the diagonal winding; releasing the pushing by the holding component after winding the wire on an ending point side corner of the first region; and then moving the holding component to the vicinity of the starting point side corner of the first region before starting the diagonal winding of next rotation.

In such winding method, it is conceivable that the method comprises: rotating the holding component in a same direction as the rotation of the winding shaft also after the releasing of the pushing; retracting the holding component, before the holding component reaches a bridge portion of the wire located between the winding shaft and the wire supply port, so as not to interfere with the bridge portion; and moving, after the holding component passes the bridge portion, the holding component with respect to the winding shaft to a position to push the wire in the next rotation.

Further, it is conceivable that the method comprises: rotating the holding component in the same direction as the rotation of the winding shaft at a higher speed than the winding shaft, after the retracting of the holding component; and synchronizing the rotation of the holding component with the rotation of the winding shaft after the holding component passes the bridge portion.

Further, it is conceivable that the method comprises: retracting the holding component, after releasing the pushing by the holding component, so that the holding component does not interfere with the rotating winding shaft; then rotating the holding component in a direction opposite to the rotation direction of the winding shaft; synchronizing the rotation of the holding component with the rotation of the winding shaft in vicinity on a downstream side along the rotation direction of the winding shaft, of a bridge portion of the wire located between the winding shaft and the wire supply port; and then moving the holding component with respect to the winding shaft to a position to push the wire in the next rotation.

In each of the above winding methods, it is conceivable that the winding shaft is held between two main shafts arranged concentrically and in opposition to each other, two holding components constituting the holding component are provided to respectively correspond to the respective main shafts, and the step is performed, regarding each layer of the wire helically wound on the winding shaft, using one of the two holding components by which the retracting of the holding component can be performed with smaller movement of the holding component.

The present invention can be implemented in any form, such as an apparatus, a system, a computer program for controlling an apparatus, a recording medium in which the computer program is recorded, and the like, in addition to the above-described method.

According to the above-described configuration, configuration and control of the winding apparatus can be simplified, cost of the winding apparatus can be reduced, and its winding quality can be improved.

BRIEF DESCRIPTION OF DRAWINGS

FIG. 7A is a plan view showing a state where pushing by a holding component is performed at a wind starting point side of a surface on which diagonal winding is performed. FIG. 7B is a side view showing a winding state of the surface on which the diagonal winding is performed. FIG. 7C is a plan view showing a state where the holding component is retracted. FIG. 7D is a side view showing a winding state in a surface adjacent to the surface on which the diagonal winding is performed. FIG. 7E is a plan view showing a state where the segment core is rotated once from the state of FIG. 7A.

FIG. 8A is a side view showing a state where the holding component is at a second retracted position. FIG. 8B is a side view showing a state where the holding component is at a first retracted position. FIG. 8C is a side view showing a state where the holding component is at a wire pushable position.

FIG. 9A is a plan view showing a state where pushing by the holding component is performed at the wind starting point side of the surface on which diagonal winding is performed. FIG. 9B is a side view showing a winding state of the surface on which the diagonal winding is performed. FIG. 9C is a plan view showing a state where the holding component is retracted. FIG. 9D is a side view showing a winding state in a surface adjacent to the surface on which the diagonal winding is performed. FIG. 9E is a plan view showing a state where the segment core is rotated once from the state of FIG. 9A.

FIG. 14F is a side view showing a winding state during downward winding, of a surface on which the diagonal winding is performed. FIG. 14G is a plan view showing a state where winding of the surface on which the diagonal winding is performed while pushing by the holding component is performed. FIG. 14H is a side view showing a winding state on a surface adjacent to the surface on which the diagonal winding is performed.

FIG. 16A is a diagram for explaining that the holding component of the upper winding apparatus is suitable at the time of the upward winding. FIG. 16B is a diagram for explaining that the holding component of the upper winding apparatus is not suitable at the time of the downward winding. FIG. 16C is a diagram for explaining that the holding component of the lower winding apparatus is suitable at the time of the downward winding.

DESCRIPTION OF EMBODIMENTS

Hereinafter, an embodiment of the present invention will be described with reference to FIG. 1 to FIG. 16.

Figure 1:
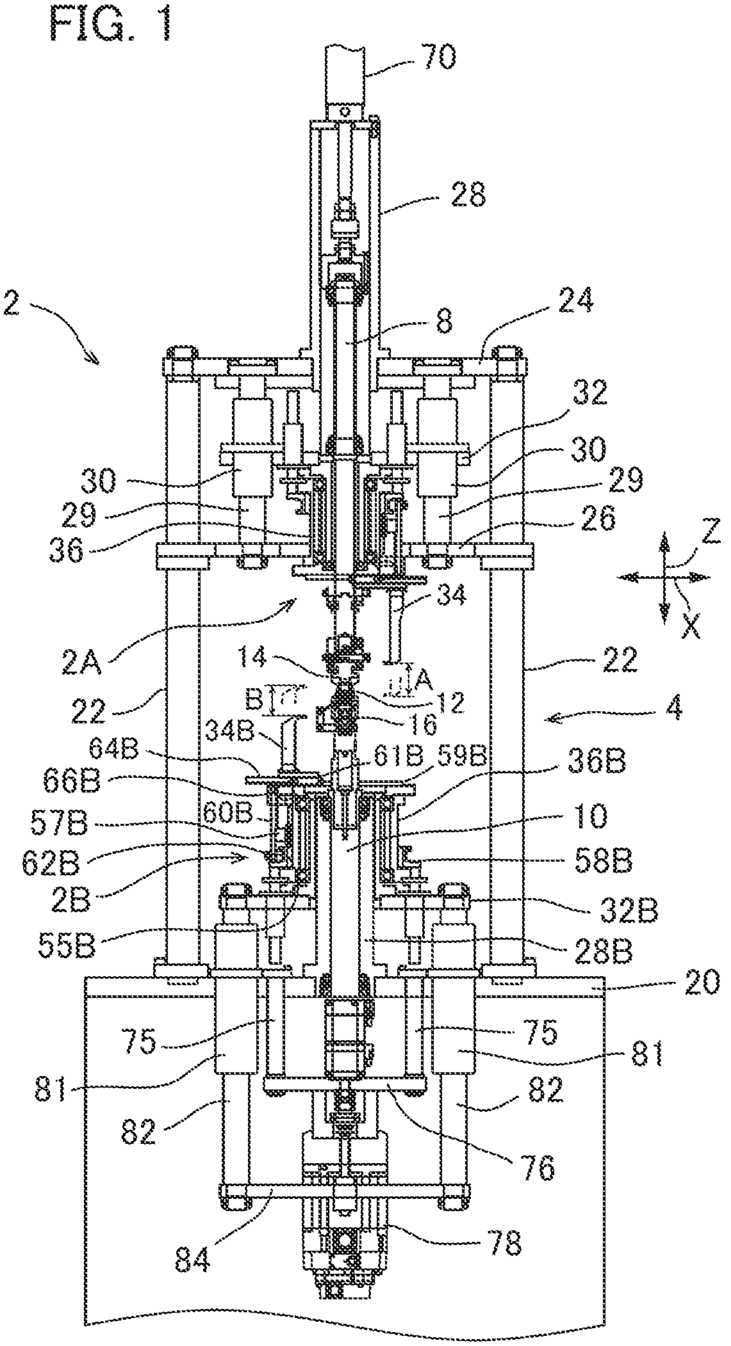
FIG. 1 is a schematic front view of a winding apparatus according to an embodiment of the present invention.
Figure 2:
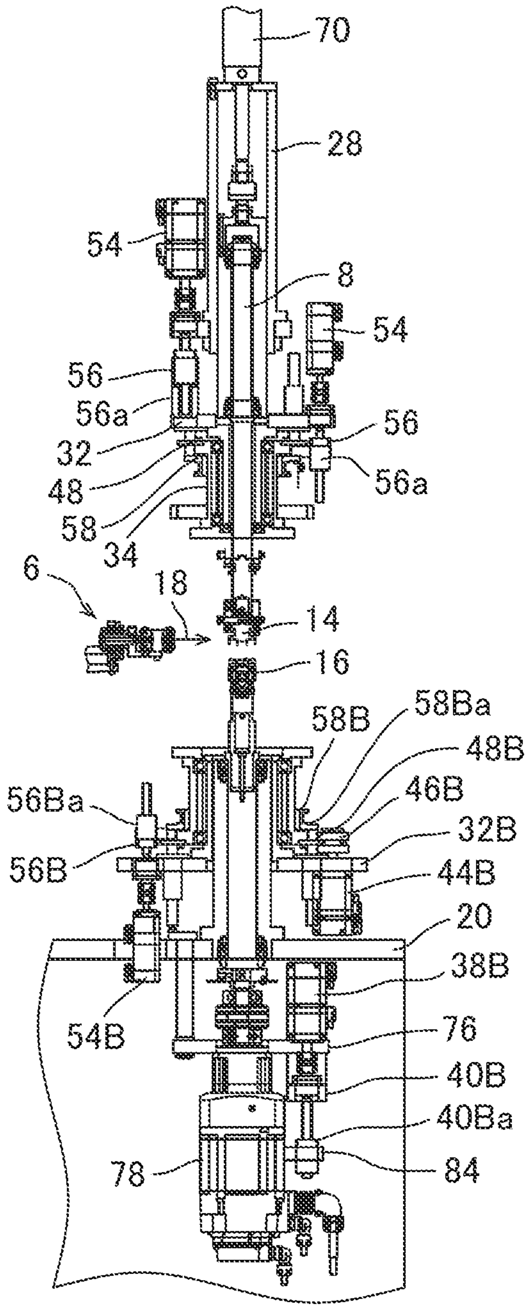
FIG. 2 is a left side view of the winding apparatus shown in FIG. 1.
Figure 3:
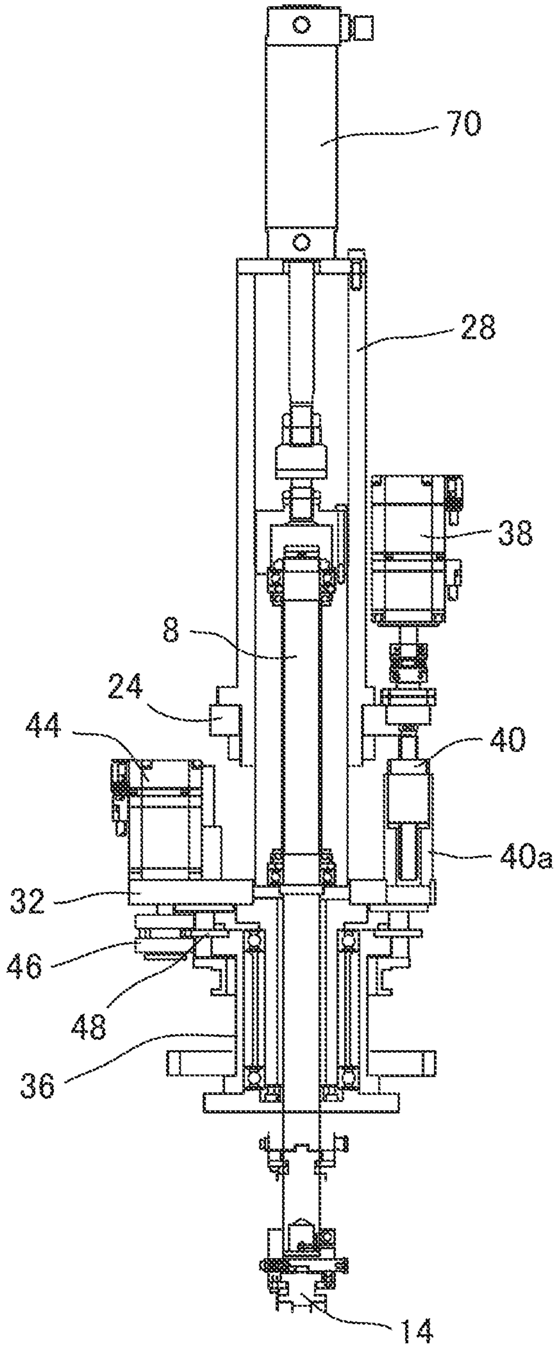
FIG. 3 is a right side view of an upper winding apparatus of the winding apparatus shown in FIG. 1.
Figure 4:
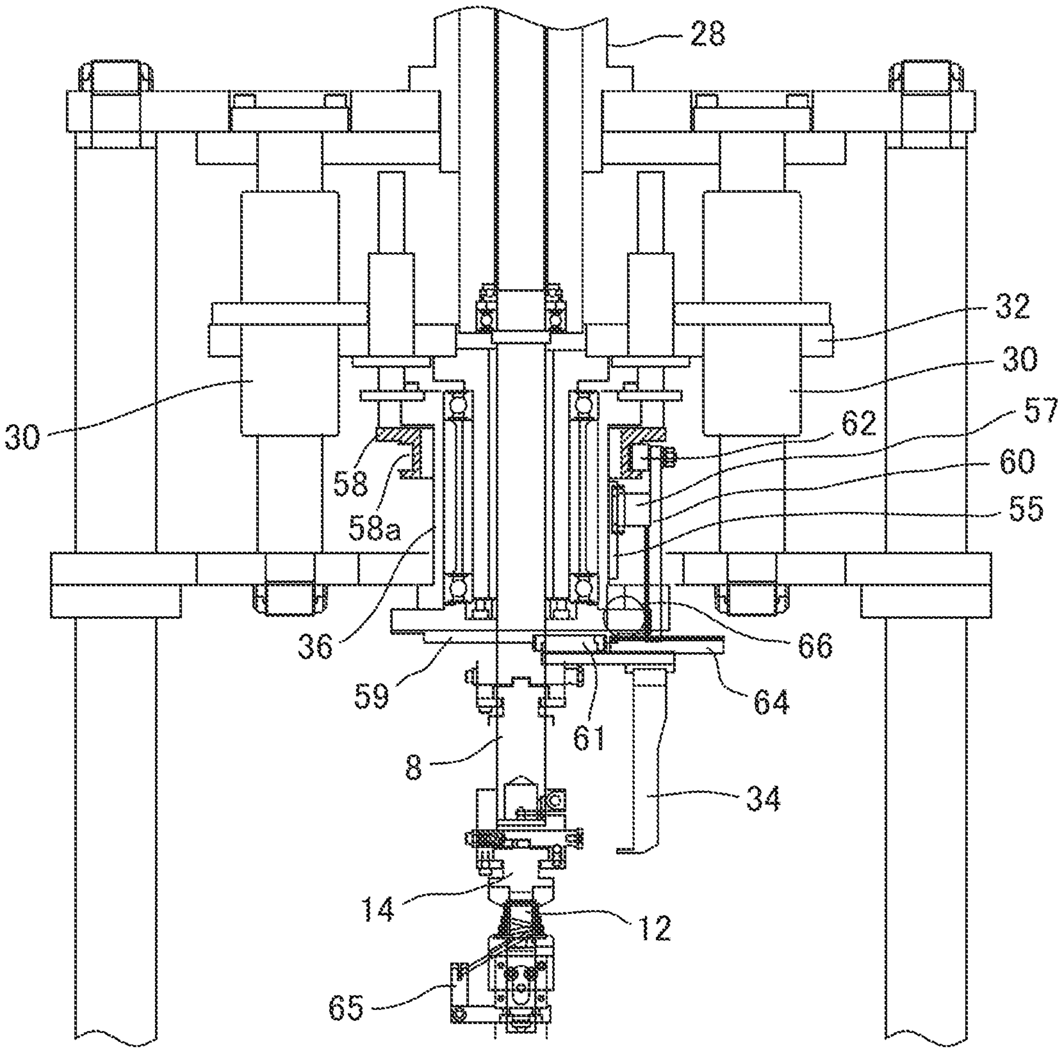
FIG. 4 is an enlarged view of periphery of a radial movement structure of the upper winding apparatus of the winding apparatus shown in FIG. 1.
Figure 5:
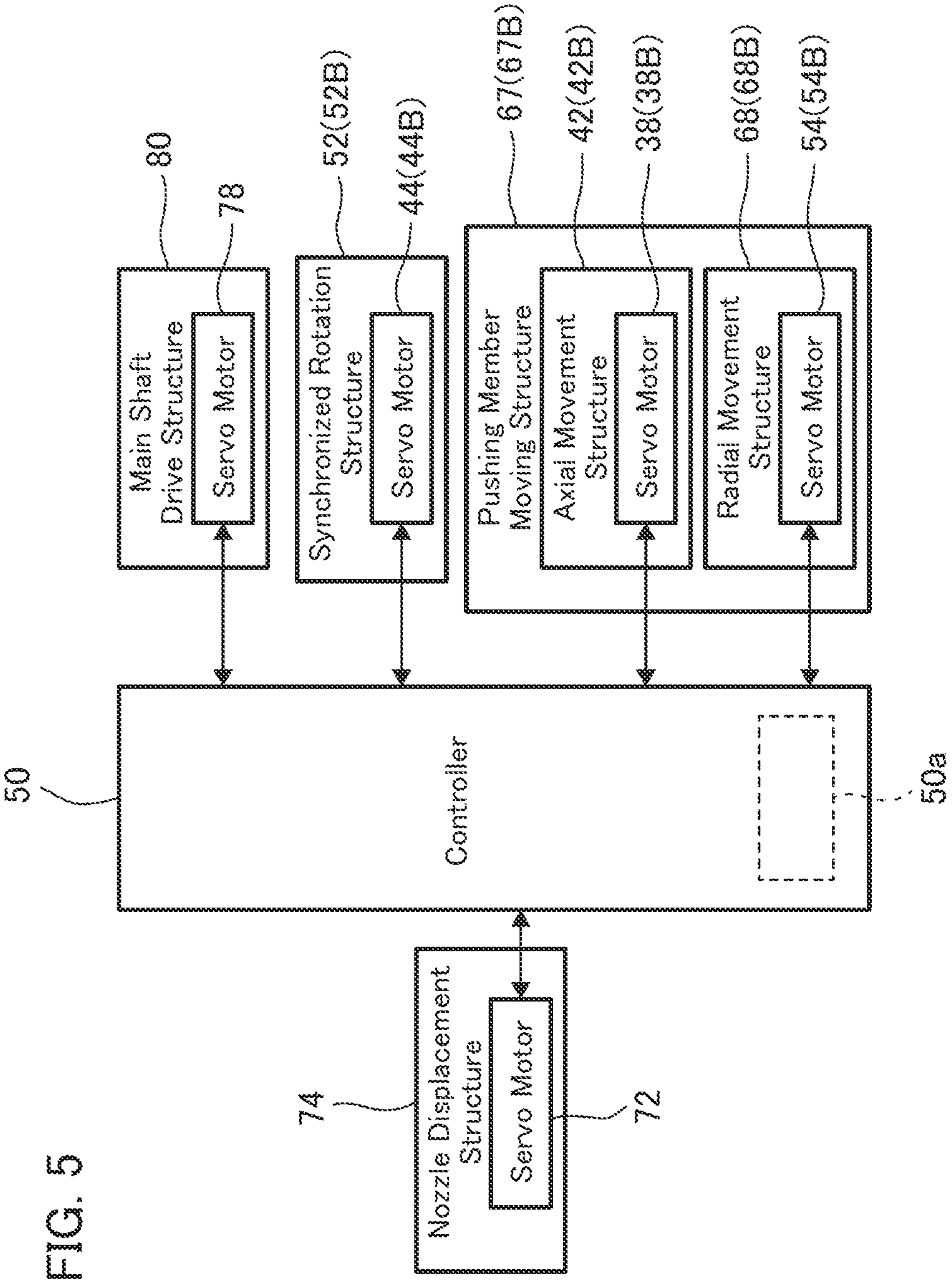
FIG. 5 is a control block diagram of the winding apparatus shown in FIG. 1
Figure 6:
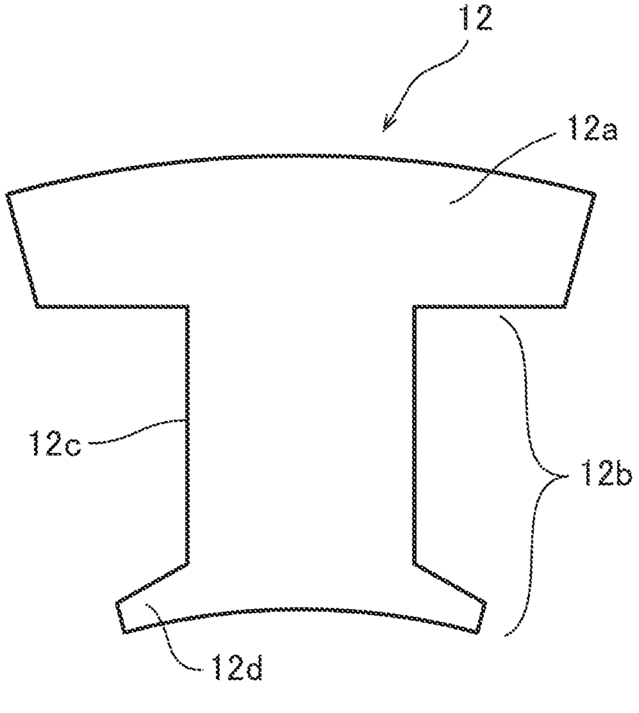
FIG. 6 is a plan view of a segment core which is an example of an object to be wound by the winding apparatus shown in FIG. 1.

First, with reference to FIG. 1 to FIG. 6, a winding apparatus according to an embodiment of the present invention will be described. FIG. 1 is a schematic front view of the winding apparatus. FIG. 2 is a left side view of the winding apparatus shown in FIG. 1. FIG. 3 is a right side view of an upper winding apparatus of the winding apparatus shown in FIG. 1. FIG. 4 is an enlarged view of periphery of a radial movement structure of the upper winding apparatus of the winding apparatus shown in FIG. 1. FIG. 5 is a control block diagram of the winding apparatus shown in FIG. 1. FIG. 6 is a plan view of a segment core which is an example of an object to be wound by the winding apparatus shown in FIG. 1.

A winding apparatus 2 shown in FIG. 1 and the like is an implementation of the winding apparatus of the present invention as a segment core winding apparatus configured to perform winding around a winding shaft of a segment core of a stator of an electrical rotating machine shown in FIG. 6.

As shown in FIG. 1, the winding apparatus 2 is configured as a vertical twin configuration including an upper winding apparatus 2A, a lower winding apparatus 2B, a support structure 4 configured to support these winding apparatuses in opposition to each other, a nozzle 6 (see FIG. 2) that is a wire supply port configured to supply a wire to be wound around a segment core to be described later, and a controller 50 (see FIG. 5). The controller 50 can be configured, for example, as a microcomputer including a processor, a memory, and an input/output interface.

In FIG. 1, an arrow Z indicates an up-down direction, and an arrow X indicates a left-right direction (also referred to as a front-rear direction), and a direction orthogonal to the X direction on a horizontal plane is a depth direction. In addition, in the present specification, the upper side and the lower side of FIG. 1 are described as "upper" and "lower", respectively, unless otherwise specified, but they do not need to coincide with the upper and lower sides with respect to the gravitational direction.

The upper winding apparatus 2A has an upper main shaft (driven shaft) 8 which extends in the up-down direction and is rotatably supported, and the lower winding apparatus 2B has a lower main shaft (drive shaft) 10 which extends in the up-down direction and has an end concentrically opposed to the upper main shaft 8. An upper winding jig 14 configured to hold one end side of the segment core 12 is attached to a distal end portion (the lower end portion in the figure) of the upper main shaft 8, and a lower winding jig 16 configured to hold the other end side of the segment core 12 is attached to a distal end portion (the upper end portion in the figure) of the lower main shaft 10.

As shown in FIG. 6, the segment core 12 includes a yoke piece 12*a* which is a divided piece of an annular yoke of the stator core, and a tooth 12*b* integral with the yoke piece 12*a*. The tooth 12*b* includes a winding shaft 12*c* having a quadrangular cross section in a plane perpendicular to the axial direction, and an arcuate flange 12*d* formed at an inner diameter-side end of the winding shaft 12*c* of the stator core and extending in the circumferential direction of the stator. A flat surface (wide surface) of a flat wire 18 (see FIG. 2) having a quadrangular (rectangular) cross section is wound around the winding shaft 12*c*. Here, the yoke piece 12*a* is held by the lower winding jig 16 and the flange 12*d* is held by the upper winding jig 14, so that the winding shaft 12*c* is concentric with both the upper main shaft 8 and the lower main shaft 10.

The winding shaft 12*c* shown in FIG. 6 is a winding shaft that is an object of the winding of the wire by the winding apparatus 2.

Hereinafter, the configuration of the winding apparatus 2 will be described in detail.

The support structure 4 includes a support base 20 configured to directly support the lower winding apparatus 2B, a plurality of support posts 22 extending upward from the support base 20, and two support plates 24, 26 fixed to upper ends of the support posts 22 and configured to support the upper winding apparatus 2A.

The upper winding apparatus 2A includes the upper main shaft 8 which is rotatably supported with its upper end side inserted into a guide cylinder 28 fixed to the upper support plate 24, two support shafts 29 fixed between the support plates 24, 26 and extending in the up-down direction, a movable plate 32 fixed to a slidable cylinder 30 slidable in the up-down direction on the respective support shafts 29 and thus movable in the up-down direction, a cylindrical holding unit 36 supported by the movable plate 32 and integral with a holding component 34, and the like. The upper main shaft 8 is disposed so as to penetrate the center of the holding unit 36.

As shown in FIG. 3, a servo motor 38, which is a drive source configured to move the holding component 34 in the axial direction (up-down direction) of the winding shaft 12*c*, is fixed to the upper support plate 24, and a ball screw structure 40 driven by the servo motor 38 is provided below the servo motor 38. A movable part 40*a* of the ball screw structure 40 is connected to the movable plate 32, and the holding unit 36 is driven by the servo motor 38 to move in the up-down direction. That is, the holding component 34 moves along axial direction of the winding shaft 12*c*. As the holding unit 36 moves, a distal end portion of the holding component 34 can move generally in a range indicated by an arrow A in FIG. 1 in the up-down direction.

The servo motor 38, the ball screw structure 40, the movable board 32, the holding unit 36, and the like constitute an axial movement structure 42 (see FIG. 5) configured to move the holding component 34 in the axial direction of the winding shaft 12*c*.

As shown in FIG. 3, a servo motor 44 is fixed to the movable plate 32, and a gear 46 is fixed to a rotation shaft of the servo motor 44. The gear 46 meshes with a flange gear 48 provided at an upper end of the holding unit 36. Thus, when the servo motor 44 operates, the holding unit 36 rotates. That is, the holding component 34 rotates around the axis of the winding shaft 12*c* (however, FIG. 3 shows a state where the holding component 34 is removed so that the configuration near the upper main shaft 8 appears).

As illustrated in FIG. 5, rotation (rotation direction, rotation speed) of the servo motor 44 is controlled by the controller 50. In the present embodiment, the controller 50 controls rotation of the servo motor 44 so that the holding component 34 rotates in synchronization with rotation of the upper main shaft 8. The servo motor 44, the gear 46, the flange gear 48, the holding unit 36, the controller 50, and the like constitute a synchronized rotation structure 52 (see FIG. 5).

As shown in FIG. 2, a servo motor 54 is fixed to the movable plate 32, and a ball screw structure 56 driven by the servo motor 54 is provided below the servo motor 54. The movable part 56*a* of the ball screw structure 56 is connected to a ring-shaped collar component 58 that is fitted to the upper end portion of the holding unit 36 and movable in the up-down direction. The collar component 58 is independent of the holding unit 36 and does not rotate. An annular groove 58*a* (see FIG. 4) is formed on an outer peripheral surface of the collar component 58.

As shown in FIG. 4, a linear guide structure including a vertical rail component 55 and a slider 57 configured to slide with respect to the vertical rail component 55 are provided integrally with the holding unit 36 on an outer peripheral surface of the holding unit 36. A vertical rack component 60 is fixed to the slider 57. A cam follower 62 is attached to an upper end portion of the vertical rack component 60, and the cam follower 62 is engaged with the annular groove 58*a* of the collar component 58. In FIG. 4, the collar component 58 is shown with hatching for clarity.

On a lower end side of the holding unit 36, a linear guide structure including a horizontal rail component 59 and a slider 61 configured to slide with respect to the horizontal rail component 59 are provided integrally with the holding unit 36. The holding component 34 and a horizontal rack component 64 are provided integrally with the slider 61.

Both the vertical rack component 60 and the horizontal rack component 64 mesh with a pinion gear 66 provided integrally with the holding unit 36. The linear guide structure refers to a structure configured to cause smooth linear sliding by interposing a rolling element such as a ball or a roller between a linear rail and a slider (carriage) configured to slide with respect to the rail. In FIG. 4, reference numeral 65 denotes a clamper for locking a distal end portion of the wire.

With the above configuration, when the servo motor 54 operates, the collar component 58 moves in the up-down direction, and accordingly, the vertical rack component 60 engaged with the collar component 58 via the cam follower 62 also moves in the up-down direction at the same time. When the vertical rack component 60 moves, the pinion gear 66 rotates, and accordingly, the horizontal rack component 64 moves in the radial direction of the winding shaft 12*c*. That is, when the servo motor 54 operates, the holding component 34 moves in the radial direction of the winding shaft 12*c*.

The servo motor 54, the ball screw structure 56, the collar component 58, the vertical rail component 55, the slider 57, the vertical rack component 60, the cam follower 62, the horizontal rail component 59, the slider 61, the horizontal rack component 64, the pinion gear 66, and the like constitute a radial movement structure 68 (see FIG. 5) configured to move the holding component 34 in the radial direction of the winding shaft 12*c*. The axial movement structure 42 and the radial movement structure 68 constitute a holding component moving structure 67.

In FIG. 1 to FIG. 3, reference numeral 70 denotes an air cylinder which is a driving source configured to hold the segment core 12 with pressure between the upper main shaft 8 and the lower main shaft 10 by pressing the upper main shaft 8 downward.

As shown in FIG. 5, the nozzle 6 configured to supply the wire (in this embodiment, the flat wire 18) to be wound around the winding shaft 12*c* is displaced at least in the axial direction (up-down direction) of the winding shaft 12*c* by a nozzle displacement structure 74 driven by a servo motor 72. Strictly speaking, the nozzle 6 can be displaced in the left-right direction and the depth direction in addition to the up-down direction, and further can be rotated around the axis of the wire to twist the wire. The nozzle displacement structure 74 is controlled by the controller 50 via the servo motor 72.

Next, configuration of the lower winding apparatus 2B will be described. Since the configuration of the lower winding apparatus 2B is substantially the same as the configuration of the upper winding apparatus 2A, the parts corresponding to the configuration of the upper winding apparatus 2A are distinguished by the same reference numerals with suffix of alphabet B, and redundant explanation will be omitted as appropriate.

As shown in FIG. 1, two support shafts 75 are fixed below the support base 20, and a servo motor 78 configured to rotationally drive the lower main shaft 10 of the lower winding apparatus 2B is fixed to the plate 76 supported by these support shafts 75. Since the lower main shaft 10 and the upper main shaft 8 are connected via the segment core 12 as described above, when the lower main shaft 10 is rotationally driven by the servo motor 78, the segment core 12 rotates and the upper main shaft 8 is also driven to rotate. The servo motor 78, the lower main shaft 10, a guide-tube 28B, and the like constitute a main shaft drive structure 80 (see FIG. 5) configured to rotationally drive the main shafts.

Two support cylinders 81 extending in the up-down direction are fixed to the support base 20, and a sliding shaft 82 is inserted into each support cylinder 81. Lower end side of each sliding shaft 82 is connected to one another via a plate 84, and thus each sliding shaft 82 is integrally slidable in the up-down direction. As shown in FIG. 2, a servo motor 38B is fixed to the plate 76, and a ball screw structure 40B driven by the servo motor 38B is provided below the servo motor. A movable part 40Ba of the ball screw structure 40B is connected to the plate 84, and the two sliding shafts 82 are moved in the up-down direction by driving the servo motor 38B. A movable plate 32B configured to support the holding unit 36B is fixed to respective upper end sides of the two sliding shafts 82. The servo motor 38B, the ball screw structure 40B, the movable plate 32B, the holding unit 36B, and the like constitute an axial movement structure 42B (see FIG. 5) configured to move the holding component 34B in the axial direction of the winding shaft 12*c*. As the holding unit 36B moves, a distal end portion of the holding component 34B can move generally in a range indicated by an arrow B in FIG. 1 in the up-down direction.

As shown in FIG. 2, a servo motor 44B is fixed to a lower surface of the movable plate 32B, and a gear 46B is fixed to a rotary shaft of the servo motor 44B. The gear 46B meshes with a flange gear 48B provided at an upper end of the holding unit 36B. Thus, when the servo motor 44B operates, the holding unit 36B rotates. That is, the holding component 34B rotates around the axis of the winding shaft 12*c*. As shown in FIG. 5, rotation (rotation direction, rotation speed) of the servo motor 44B is controlled by the controller 50. In this embodiment, the controller 50 controls rotation of the servo motor 44B so that the holding component 34B rotates in synchronization with rotation of the lower main shaft 10 (and the upper main shaft 8). The servo motor 44B, the gear 46B, the flange gear 48B, the holding unit 36B, the controller 50, and the like constitute a synchronized rotation structure 52B.

A servo motor 54B is fixed to the support base 20, and a ball screw structure 56B driven by the servo motor 54B is provided above the servo motor 54B. A movable portion 56Ba of the ball screw structure 56B is connected to a ring-shaped collar component 58B that is fitted to the lower end portion of the holding unit 36B. The collar component 58B is independent of the holding unit 36B and does not rotate. An annular groove 58Ba is formed on an outer peripheral surface of the collar component 58B.

As shown in FIG. 1, a linear guide structure including a vertical rail component 55B and a slider 57B configured to slide with respect to the vertical rail component 55B are provided integrally with the holding unit 36B on an outer peripheral surface of the holding unit 36B. A vertical rack component 60B is fixed to the slider 57B. A cam follower 62B is attached to a lower end portion of the vertical rack component 60B, and the cam follower 62B is engaged with the annular groove 58Ba of the collar component 58B.

On an upper end side of the holding unit 36B, a linear guide structure including a horizontal rail component 59B and a slider 61B configured to slide with respect to the horizontal rail component 59B are provided integrally with the holding unit 36B. The holding component 34B and a horizontal rack component 64B are provided integrally with the slider 61B.

Both the vertical rack component 60B and the horizontal rack component 64B mesh with a pinion gear 66B provided integrally with the holding unit 36B.

With the above configuration, when the servo motor 54B operates, the collar component 58B moves in the up-down direction, and accordingly, the vertical rack component 60B engaged with the collar component 58B via the cam follower 62B also moves in the up-down direction. When the vertical rack component 60B moves, the pinion gear 66B rotates, and accordingly the horizontal rack component 64B moves in the radial direction of the winding shaft 12*c*. That is, when the servo motor 54B operates, the holding component 34B moves in the radial direction of the winding shaft 12*c*.

The servo motor 54B, the ball screw structure 56B, the collar component 58B, the vertical rail component 55B, the slider 57B, the vertical rack component 60B, the cam follower 62B, the horizontal rail component 59B, the slider 61B, the horizontal rack component 64B, the pinion gear 66B, and the like constitute a radial movement structure 68B (see FIG. 5) configured to move the holding component 34B in the radial direction of the winding shaft 12*c*.

The axial movement structure 42B and the radial movement structure 68B constitute a holding component moving structure 67B (see FIG. 5).

Next, winding operations of the winding apparatus 2 will be described by pattern with reference to FIG. 7 to FIG. 14. Each winding operation according to the patterns is an embodiment of the winding method according to the present invention.

Winding around the segment core 12 can be performed by either the upper winding apparatus 2A or the lower winding apparatus 2B, as seen from the configuration of the winding apparatus 2 described above, but winding by the upper winding apparatus 2A will be described here. As illustrated in FIG. 5, a computer program for executing each pattern is stored in the nonvolatile memory 50*a* of the controller 50, and the controller 50 having function of a microcomputer controls operations of respective servo motors of the synchronized rotation structure 52, the holding component moving structure 67, the nozzle displacement structure 74, and the main shaft drive structure 80 based on the program, and thereby the winding apparatus 2 can execute the winding operation of each pattern described below.

[Synchronized Rotational Operation Pattern (Upward Winding): FIG. 7A to FIG. 8C]

First, referring to the FIG. 7A to FIG. 8C, winding operation during upward winding according to a synchronized rotational operation pattern will be described.

FIG. 7A to FIG. 7E are a series of views showing the winding operation during upward winding according to the synchronized rotational operation pattern performed by the upper winding apparatus 2A of the winding apparatus 2. FIG. 8A to FIG. 8C are side views for explaining positional relations of the holding component 34 with respect to the segment core 12.

The synchronized rotational operation pattern described here is an operation pattern in which rotation of the holding component 34 is synchronized with rotation of the main shafts (the upper main shaft 8 and the lower main shaft 10). The upward winding is an operation of winding the flat wire 18 as a wire, around the winding shaft 12*c* from bottom to top in its axial direction.

FIG. 7A to FIG. 7E show the winding operation of the first layer as an exemplary operation of the upward winding according to the synchronized rotational operation pattern.

Figures 7A, 7B, 7C, 7D, 7E:
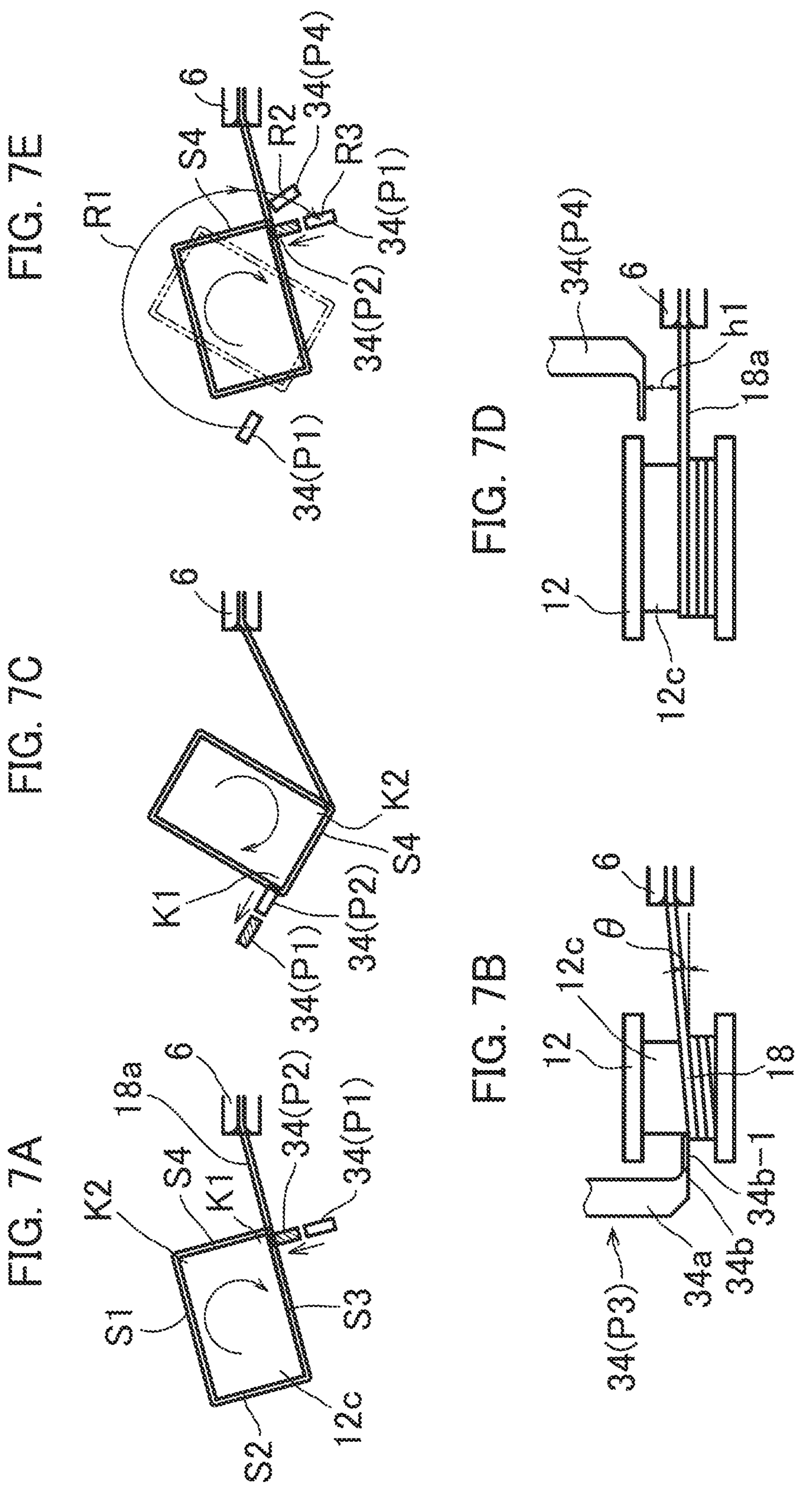
FIG. 7A to FIG. 7E are a series of views showing a winding operation (upward winding) according to a synchronized rotational operation pattern by the upper winding apparatus of the winding apparatus shown in FIG. 1.
Figure 8A:
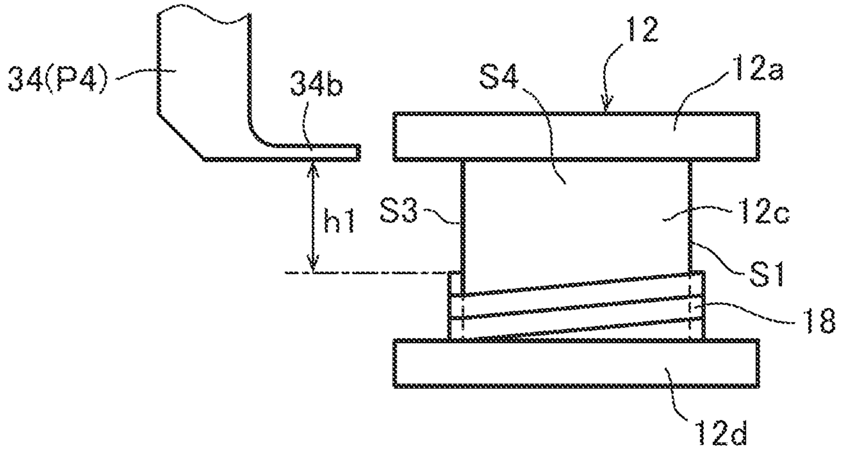
FIG. 8A to FIG. 8C are side views for explaining positional relations of the holding component with respect to the segment core.
Figure 8B:
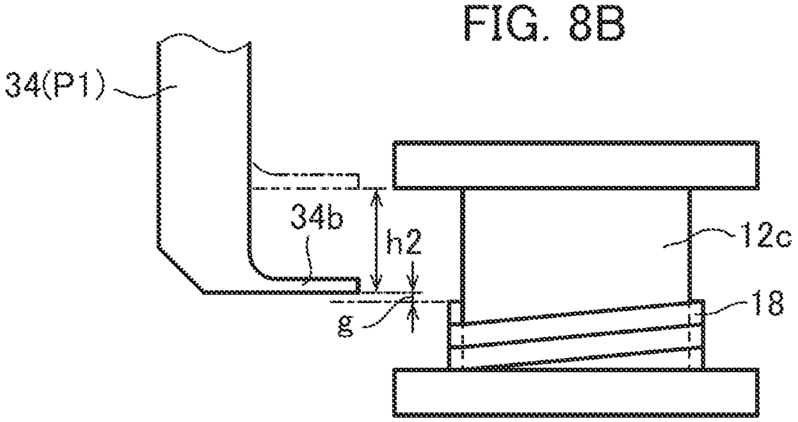
Figure 8C:
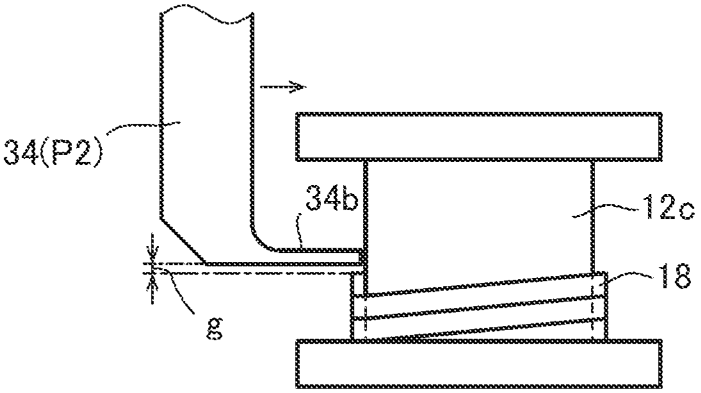

As shown in FIG. 7A, the single holding component 34 is positioned in the vicinity of a corner K1 which is at a starting point side of winding (starting point of diagonal winding) on a surface S4 (corresponding to a first region between two corners K1, K2) on which the diagonal winding is performed, among four surfaces (S1, S2, S3, S4) of the winding shaft 12*c*.

The diagonal winding means a winding operation in which positions of the wires in the axial direction (the axial direction of the winding shaft) at the starting point and ending point of the winding on one surface of the winding shaft 12*c* are different from each other. The ending point may be above or below the starting point. In the example of FIG. 7, the diagonal winding is performed on the surface S4. In addition, the surface S1 is a winding start surface on which the flat wire 18 is first wound.

A position indicated by a rectangle without hatching is a first retracted position P1 (refer to FIG. 8B) to which the holding component 34 is retracted in the radial direction of the winding shaft 12*c*. Through the control of the radial movement structure 68 and the axial movement structure 42 by the controller 50, the holding component 34 can be slightly lowered after advancing from the first retracted position P1 to a wire pushable position P2 (see FIG. 8C) indicated by a hatched rectangle as indicated by an arrow, and push the flat wire 18 from the upper side. This position is a wire pushing position P3 shown in FIG. 7B, and is the position of the holding component 34 when starting the diagonal winding. A surface of the winding shaft 12*c* that appears in FIG. 7B is the surface S4.

Incidentally, the holding component 34 starts pushing of the flat wire after the winding has progressed to the corner K1 (the corner sandwiched between the surface S4 and the surface S3) of the surface S3 which is located before the surface S4 where the diagonal winding is performed, that is, after the flat wire 18 touches the corner K1 and before the flat wire 18 touches the surface S4. This start timing of the pushing is referred to as "hold starting point". It is preferable that the hold starting point is as close as possible to the timing when the flat wire 18 touches the corner K1.

The segment core 12 rotates clockwise from the state shown in FIG. 7A, and the diagonal winding is performed here as shown in FIG. 7B. The diagonal winding is performed by displacing the nozzle 6, through control of the nozzle displacement structure 74 by the controller 50, to an upper position than that for winding on surfaces not performing diagonal winding thereon so that the flat wire 18 has an angle θ required for the diagonal winding, while pushing the flat wire 18 by the holding component 34 toward a wound wire side.

The holding component 34 has a shape including a strip-shaped main body 34*a* extending in the axial direction of the winding shaft 12*c*, and a pushing piece 34*b* projecting in an L-shape to the radial direction of the winding shaft 12*c* from a distal end (lower end in the figure) of the main body 34*a*. The holding component 34 pushes the upper surface of the flat wire 18 by the surface 34*b*-1 on the lower side (the direction in which the main body 34*a* extends) of the distal end portion of the pushing piece 34*b*. The wound wire side means the side on which the winding has already been made, but note that there is actually no already wound wire on this side of the first row in the axial direction.

As shown in FIG. 7C, the controller 50 releases the pushing by the holding component 34 and performs control to return the nozzle 6 to a position for winding on surfaces not performing diagonal winding thereon at a timing when rotation of the segment core 12 proceeds and the flat wire 18 is wound around the corner K2 which is at an ending point side of the winding (ending point of diagonal winding) on the surface S4. After the flat wire 18 is wound around the corner K2, displacement of the flat wire 18 in the axial direction of the winding shaft 12*c* is unlikely to occur due to contact friction with the corner K2 in the bent state. In other words, after completion of the winding around the corner K2, it can be considered that the corner K2 exhibits, without pushing by a holding component such as the holding component 34, a function of preventing positional deviation of the flat wire 18 same as the case with the pushing.

In the present embodiment, based on this idea, the number of holding components is reduced in consideration that a state where the flat wire 18 has been wound around the corner K2 can be substituted for pushing by the holding component, regarding the surface S4 where the diagonal winding which is prone to winding defects is performed. Winding on the surfaces S1 to S3 other than the surface S4 on which the diagonal winding is performed, is winding in a state where the flat wire is horizontal. Accordingly, if the displacement control of the nozzle 6 is performed with a certain degree of accuracy, positional deviation occurs less likely. Thus, it is possible to solve the problem of winding failure even in the configuration of pushing the wire by only one holding component 34.

After rotation of the segment core 12 reaches a position where the flat wire 18 has been wound around the corner K2, there is no concern about positional deviation of the flat wire 18 as described above. Therefore, at the timing when the flat wire 18 is wound on the corner K2, thorough the control of the controller 50, the holding component 34 is slightly moved upward in the axial direction to the wire pushable position P2 to release the pushing so as not to damage the insulation film of the flat wire 18, and then moved in the radial direction to return to the first retracted position P1. Thereafter, as shown in FIG. 7D, in a state where the nozzle 6 is at the position for winding on surfaces not performing diagonal winding thereon, winding on the surfaces S1, S2, S3 of the winding shaft 12*c* progresses with rotation of the segment core 12. The surface S3 of the winding shaft 12*c* appears in FIG. 7D.

More specifically, the timing at which the flat wire 18 is wound on the corner K2 is any timing after the flat wire 18 touches the corner K2. In this embodiment, since the pushing of the flat wire 18 by the holding component 34 is released at this timing, this timing is referred to as "hold ending point". The hold ending point is preferably as close as possible to the timing at which the flat wire 18 touches the corner K2. At least, the hold ending point is at a timing when the flat wire 18 has been bent at the corner K2 to an extent that the positional deviation of the flat wire 18 in the axial direction of the winding shaft 12*c* is expected to unlikely occur due to the contact friction with the corner K2 as described above.

The hold ending point is an ending point of the period during which the diagonal winding is performed while pushing the flat wire 18 by the holing component 34. In other words, the hold ending point is a timing when the pushing by the holding component 34 started in the state shown in FIG. 7A becomes no longer necessary. Therefore, the holding component 34 can be retracted to the first retracted position P1 after the hold ending point.

Thereafter, before the segment core 12 completes one rotation, specifically, before the holding component 34 reaches a bridge portion 18*a* of the flat wire 18 located between the segment core 12 and the nozzle 6 (while the holding component moves a range of R1 shown in FIG. 7E), as shown in FIG. 7D, the controller retracts the holding component 34 to the second retracted position P4, upward in the axial direction of the winding shaft 12*c* by a distance h1, so that the holding component 34 does not interfere with the bridge portion 18*a* and can pass the bridge portion 18*a*. Further, the controller 50 performs control to move the holding component 34, after the holding component 34 passes the bridge portion 18*a* and until the segment core 12 completes one rotation from the state of FIG. 7A, to the wire pushing position P3 for the next rotation following the completed rotation.

Specifically, after the holding component 34 passes the bridge portion 18*a* and until the segment core 12 completes one rotation (while the holding component 34 moves from R2 to R3 of FIG. 7E), the controller 50 places the holding component 34 at the wire pushable position P2 with a small gap g to the upper surface of the flat wire 18 as shown in FIG. 8C. This placing is performed after shifting the holding component 34 to the first retracted position P1 downward by a distance h2 which is slightly shorter than the distance h1 (see FIG. 8A) as shown in FIG. 8B, or during this shifting. Thereafter, the controller 50 further shifts the holding component 34 downward to the wire pushing position P3 as shown in FIG. 7B at the same time as or after the segment core 12 completes one rotation. Through this further shifting, the holding component 34 pushes the flat wire 18 from the hold starting point in the winding of the next rotation.

The second retracted position P4 shown in FIG. 8A is a position for retracting the holding component 34 so as not to interfere with the bridge portion 18*a*. The first retracted position P1 shown in FIG. 8B is a preliminary position for moving the holding component 34 to the wire pushable position P2.

The above-described operation is repeated for each rotation of the segment core 12 to form a first layer of the winding. As shown in FIG. 8C, by placing the holding component 34 at the wire pushable position P2 with a gap g from the already wound flat wire 18, and subsequently moving the holding component 34 downward in the axial direction of the winding shaft 12*c* to push the flat wire 18, it is possible to push the flat wire 18 without damaging its insulating film.

In the operation pattern described here, when retracting the holding component 34 from the wire pushing position P3 to the second retracted position P4 where the holding component 34 can pass the bridge portion 18*a* without interference, the holding component 34 is firstly shifted from the wire pushable position P2 to the first retracted position P1 and subsequently further shifted upward in the axial direction of the winding shaft 12*c*. However, it is conceivable that the holding component 34 is shifted upward from the wire pushable position P2 shown in FIG. 8C to an extent that the holding component can pass the bridge portion 18*a* without interference, without retracting the holding component 34 to the first retracted position P1 (it is sufficient to retract the holding component 34 to such a position instead of the second retracted position P4).

However, according to such a retraction method, there is no enough space for retraction of the holding component 34 when the flat wire 18 reaches the vicinity of the yoke piece 12*a* as the winding proceeds. Accordingly, at that time, the holding component 34 should be retracted to the second retracted position P4. Therefore, from a viewpoint of simplifying the control by uniformizing the control amounts, the present embodiment adopts the above described retraction path of retracting the holding component 34 to the second retracted position P4 in all the rotations. The second retracted position P4 may also serve as the first retracted position P1. In other words, the starting position of the holding component 34 shown in FIG. 7A may be the second retracted position P4.

Further, the timing at which the pushing of the flat wire 18 by the holding component 34 is released does not have to be the same as the timing at which the flat wire 18 is wound on the corner K2. If the pushing of the flat wire 18 is released at a timing later than the timing at which the flat wire 18 is wound on the corner K2, the time that can be taken to retract the holding component 34 to the second retracted position P4 to complete the movement prior to reaching the bridge portion 18*a* of the flat wire 18 is reduced by the amount of the backward shift of the timing. However, if this retraction can be performed in time, there is no problem.

[Synchronized Rotational Operation Pattern (Downward Winding): FIG. 9A to FIG. 9E]

Next, referring to FIG. 9A to FIG. 9E, winding operation during downward winding according to the synchronized rotational operation pattern will be described.

FIG. 9A to FIG. 9E are a series of views showing the winding operation (downward winding) according to the synchronized rotational operation pattern performed by the upper winding apparatus 2A of the winding apparatus 2. The downward winding is an operation of winding the flat wire 18 around the winding shaft 12*c* from top to bottom in its axial direction.

FIG. 9A to FIG. 9E show the winding operation of the second layer as an exemplary operation of the downward winding according to the synchronized rotational operation pattern. This winding operation differs only in the winding direction and the like as compared with the winding operation of the upward winding described with reference to FIG. 7A to FIG. 7E. Therefore, portions same as those in the upward winding will be omitted as appropriate.

Figures 9A, 9B, 9C, 9D, 9E:
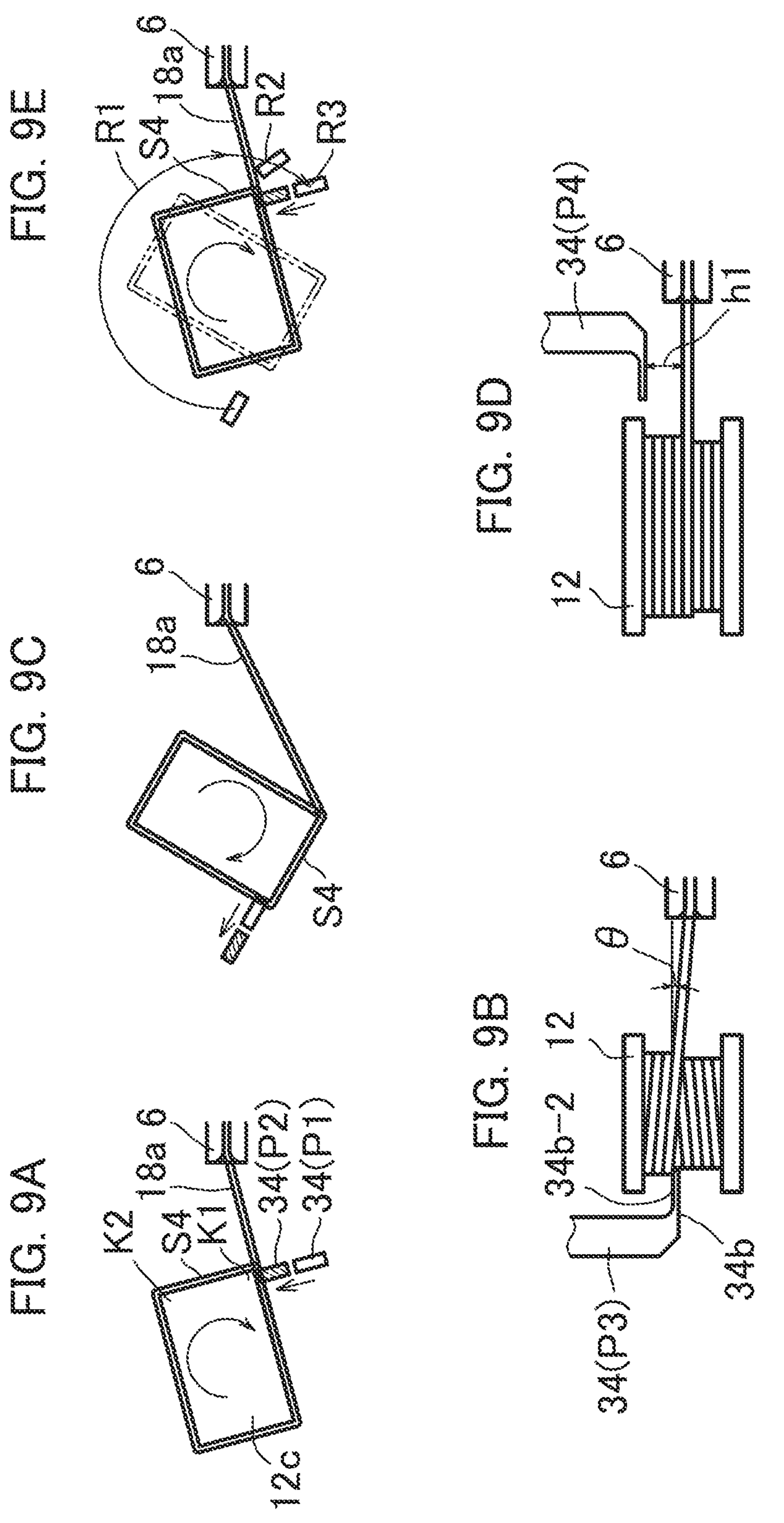
FIG. 9A to FIG. 9E are a series of views showing a winding operation (downward winding) according to the synchronized rotational operation pattern by the upper winding apparatus of the winding apparatus shown in FIG. 1.

The difference from the upward winding is that, as shown in FIG. 9B, the diagonal winding is performed by displacing the nozzle 6, through control of the nozzle displacement structure 74 by the controller 50, to a lower position than that for winding on surfaces not performing diagonal winding thereon so that the flat wire 18 has an angle θ required for the diagonal winding. Further, it is also different that the holding component 34 pushes the lower surface of the flat wire 18 by the surface 34*b*-2 on the upper side (the surface opposite to the one used in the case shown in FIG. 7B) of the distal end portion of the pushing piece 34*b*.

[First Asynchronous Rotational Operation Pattern (Upward Winding): FIG. 10A to FIG. 10E]

Next, referring to FIG. 10A to FIG. 10E, winding operation during upward winding according to first asynchronous rotational operation pattern will be described.

FIG. 10A to FIG. 10E are a series of views showing a winding operation (upward winding) according to the first asynchronous rotational operation pattern by the upper winding apparatus 2A of the winding apparatus 2.

The asynchronous rotational operation pattern described here (including second asynchronous rotational operation pattern which will be described next) is an operation pattern in which rotation of the holding component 34 is not synchronized with rotation of the main shafts (the upper main shaft 8 and the lower main shaft 10) in a partial rotation range.

FIG. 10A to FIG. 10E show the winding operation of the first layer as an exemplary operation of the upward winding according to the first asynchronous rotational operation pattern. Portions same as those in the winding operation according to the synchronized rotational operation pattern described with reference to FIG. 7A to FIG. 7E will be omitted as appropriate.

Figure 10E:
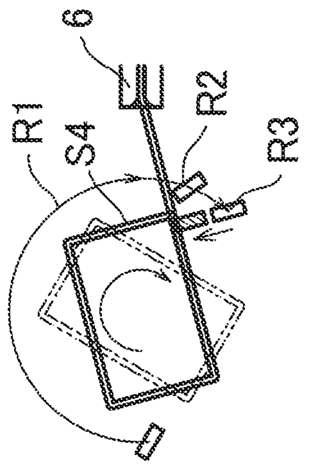
FIG. 10A to FIG. 10E are a series of views showing a winding operation (upward winding) according to a first asynchronous rotational operation pattern by the upper winding apparatus of the winding apparatus shown in FIG. 1. Each of FIG. 10A to FIG. 10E shows a state corresponding to each of FIG. 7A to FIG. 7E.
Figure 10C:
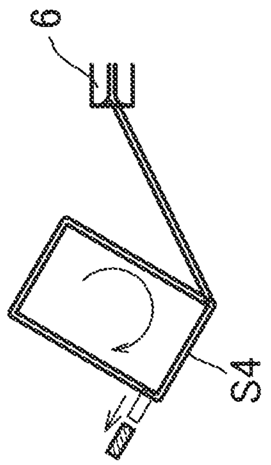
Figure 10A:
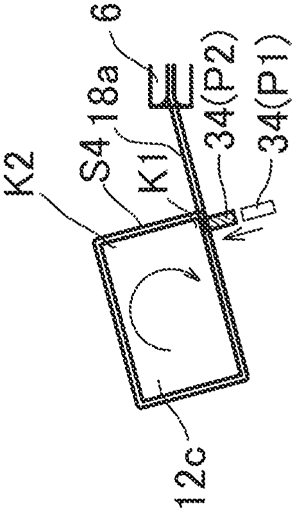
Figure 10D:
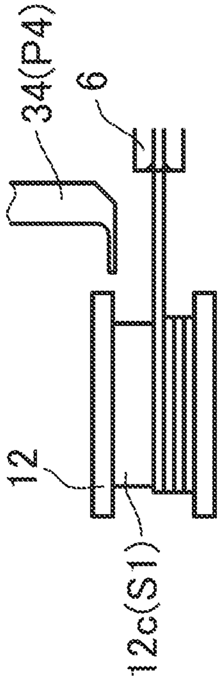
Figure 10B:
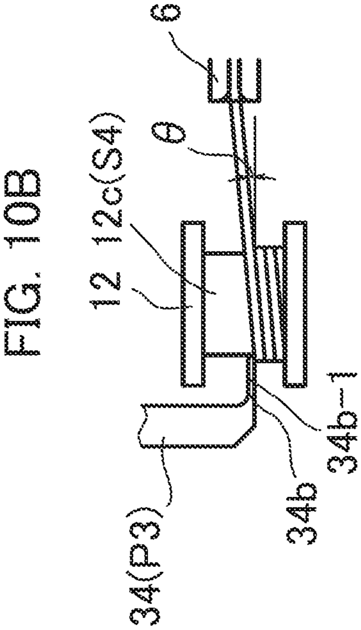

Also in the first asynchronous rotational operation pattern, from the hold starting point shown by FIG. 10A to the hold ending point shown by FIG. 10C, rotation of the holding component 34 is synchronized with rotation of the main shafts, as in the case of the synchronized rotational operation pattern. Thereafter, as shown in FIG. 10C, at a timing when the winding of the flat wire proceeds to the corner K2 which is at ending point side of the winding on the surface S4 and the flat wire is wound on the corner K2, the controller 50 retracts the holding component 34 in the radial direction of the winding shaft 12*c* to retract the holding component 34 to the first retracted position P1 so that the holding component 34 will not interfere with the rotating segment core 12, that is, to position the holding component 34 outside a range of rotational path of the segment core 12.

After that, the controller 50 releases synchronization between rotation of the holding component 34 and rotation of the main shafts and rotates the holding component 34 in the same direction as the rotation direction of the main shafts at a higher speed than the main shafts. The controller 50 also serves as a device capable of arbitrarily releasing and resuming the synchronization of rotation of the holding component 34 with respect to rotation of the main shafts. For example, if a motor having a function of detecting rotation angle of the motor itself is used, the synchronization can be arbitrarily released and resumed. Such a motor may be used as the servo motor 78 configured to rotate the segment core 12.

Further, before the holding component 34 reaches the bridge portion 18*a* of the flat wire located between the segment core 12 and the nozzle 6, the controller 50 shifts the holding component 34 upward in the axial direction of the winding shaft 12*c* to retract it to the second retracted position P4 so that the holding component 34 does not interfere with the bridge portion 18*a*. Subsequently, the controller 50 synchronizes rotation of the holding component 34 with rotation of the main shafts after the holding component 34 passes through the bridge portion 18*a*, and shifts the holding component 34 downward in the axial direction of the winding shaft 12*c* from the second retracted position P4 to the wire pushing position P3 for the next rotation following the completed rotation of the segment core 12, through the first retracted position P1 and the wire pushable position P2.

By rotating the holding component 34 faster than rotation of the main shafts (rotation of the segment core 12) as described above, the downward shift from the second retracted position P4 to the first retracted position P1 shown in FIG. 8B can be performed independently of rotation of the segment core 12, and thus time of the winding operation can be reduced.

That is, it takes a certain amount of time to move the holding component 34 from the second retracted position P4 to the first retracted position P1, and thus this time is considered to be a rate-limiting factor in the method shown in FIG. 7A to FIG. 7E. Therefore, the rotation speed of the segment core 12 can be increased only within a range in which the time required for the rotation from R2 to R3 in FIG. 7E is longer than the time required for the movement of the holding component 34 from the second retracted position P4 to the first retracted position P1. However, in the method of FIG. 10A to FIG. 10E, the downward shifting of the holding component 34 to the first retracted position P1 can be started at a timing (rotational phase) earlier than the timing at which the holding component 34 passes the bridge portion 18*a* in the example of FIG. 7A to FIG. 7E. Therefore, even if the segment core 12 is rotated faster, the time for moving the holding component 34 from the second retracted position P4 to the first retracted position P1 can be secured, and the time of the winding operation can be reduced as a whole.

As is apparent from the above explanation, the first retracted position P1 is a position where the holding component 34 does not interfere with the rotating segment core 12, and the second retracted position P4 is a position where the holding component 34 does not interfere with the bridge portion 18*a* and does not interfere also with the rotating segment core 12. Therefore, the second retracted position P4 may be used instead of the first retracted position P1 as a position where the holding component 34 does not interfere with the rotating segment core 12 (the same can be applied to the operation patterns described later).

[First Asynchronous Rotational Operation Pattern (Downward Winding): FIG. 11A to FIG. 11E]

Next, referring to FIG. 11A to FIG. 11E, winding operation during downward winding according to the first asynchronous rotational operation pattern will be described.

FIG. 11A to FIG. 11E are a series of views showing a winding operation (downward winding) according to the first asynchronous rotational operation pattern by the upper winding apparatus 2A of the winding apparatus 2.

FIG. 11A to FIG. 11E show the winding operation of the second layer as an exemplary operation of the downward winding according to the first asynchronous rotational operation pattern. This winding operation differs only in the winding direction and the like as compared with the winding operation of the upward winding described with reference to FIG. 10A to FIG. 10E. Therefore, portions same as those in the upward winding will be omitted as appropriate.

Figures 11A, 11B, 11C, 11D, 11E:
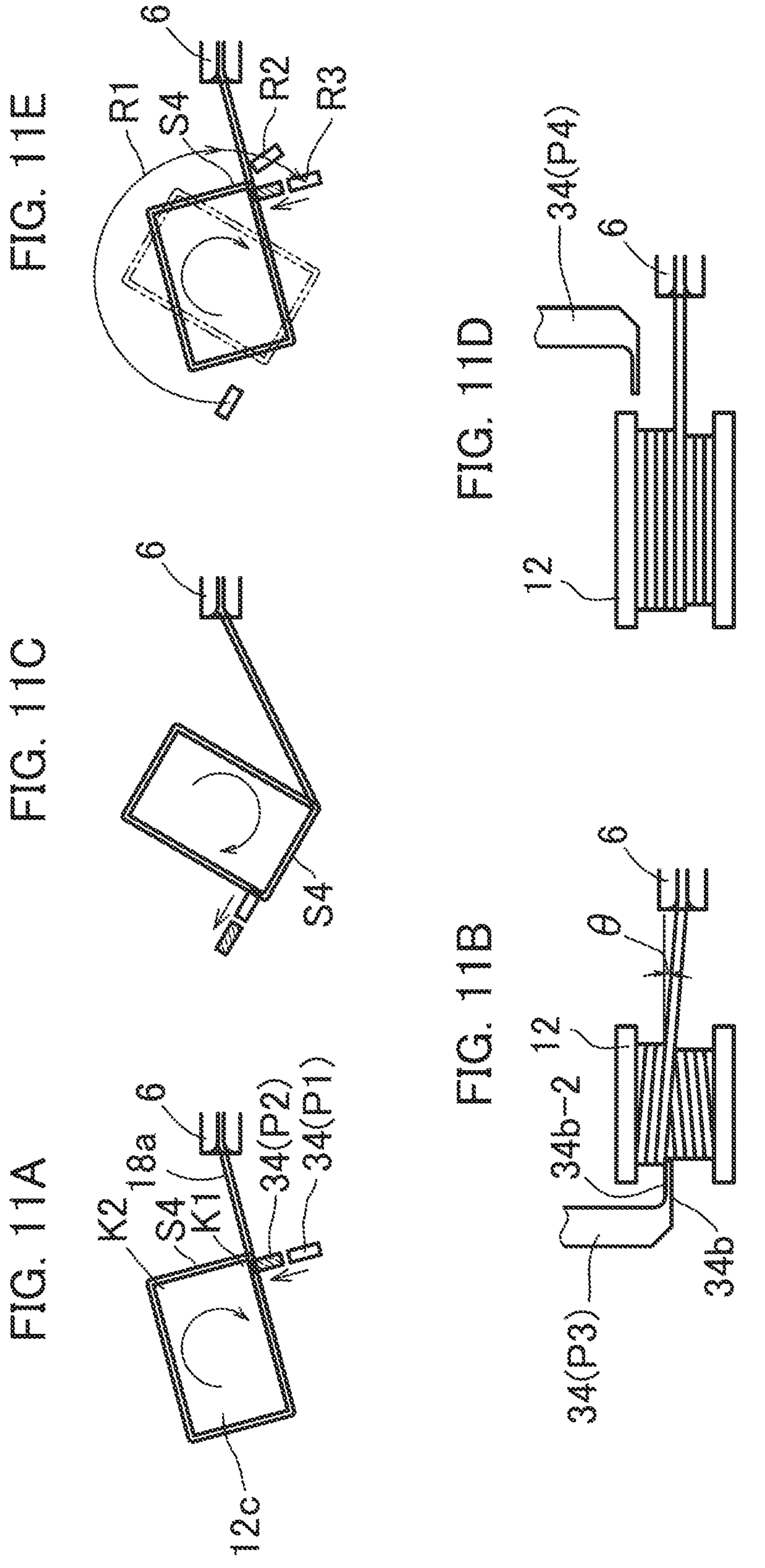
FIG. 11A to FIG. 11E are a series of views showing a winding operation (downward winding) according to the first asynchronous rotational operation pattern by the upper winding apparatus of the winding apparatus shown in FIG. 1. Each of FIG. 11A to FIG. 11E shows a state corresponding to each of FIG. 9A to FIG. 9E.

The difference from the upward winding is that, as shown in FIG. 11B, the diagonal winding is performed by displacing the nozzle 6, through control of the nozzle displacement structure 74 by the controller 50, to a lower position than that for winding on surfaces not performing diagonal winding thereon so that the flat wire 18 has an angle θ required for the diagonal winding. Further, it is also different that the holding component 34 pushes the lower surface of the flat wire 18 by the surface 34*b*-2 on the upper side (the surface opposite to the one used in the case shown in FIG. 10B) of the distal end portion of the pushing piece 34*b*.

[Second Asynchronous Rotational Operation Pattern (Upward Winding): FIG. 12A to FIG. 12E]

Next, referring to FIG. 12A to FIG. 12E, winding operation during upward winding according to second asynchronous rotational operation pattern will be described.

FIG. 12A to FIG. 12E are a series of views showing a winding operation (upward winding) according to the second asynchronous rotational operation pattern by the upper winding apparatus 2A of the winding apparatus 2.

FIG. 12A to FIG. 12E show the winding operation of the first layer as an exemplary operation of the upward winding according to the second asynchronous rotational operation pattern. Portions same as those in the winding operation according to the synchronized rotational operation pattern described with reference to FIG. 7A to FIG. 7E will be omitted as appropriate.

Figure 12A:
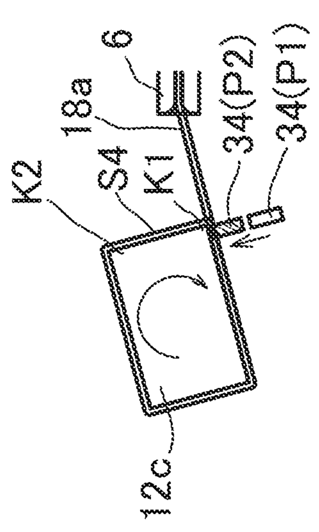
FIG. 12A to FIG. 12E are a series of views showing a winding operation (upward winding) according to a second asynchronous rotational operation pattern by the upper winding apparatus of the winding apparatus shown in FIG. 1. Each of FIG. 12A to FIG. 12E shows a state corresponding to each of FIG. 7A to FIG. 7E.
Figure 12B:
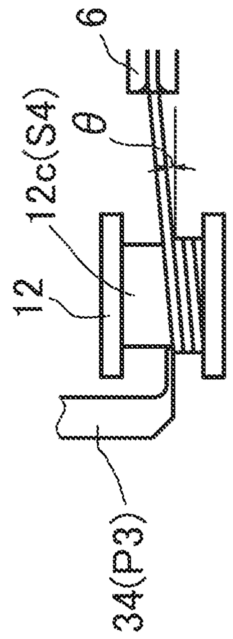
Figure 12C:
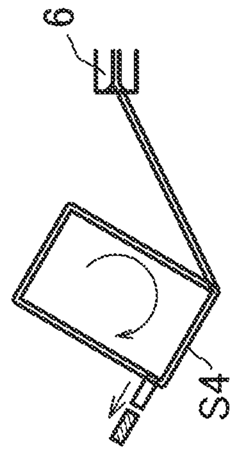

Also in the second asynchronous rotational operation pattern, from the hold starting point shown by FIG. 12A to the pushing ending point shown by FIG. 12C, rotation of the holding component 34 is synchronized with rotation of the main shafts, as in the case of the synchronized rotational operation pattern. Thereafter, as shown in FIG. 12C, at a timing when the winding of the flat wire 18 proceeds to the corner K2 which is at the ending point side of the winding on the surface S4 and the flat wire 18 is wound on the corner K2, the controller 50 retracts the holding component 34 to the first retracted position P1 (a position where the holding component 34 does not interfere with the rotating segment core 12), then releases synchronization between rotation of the holding component 34 and rotation of the main shafts, and rotates the holding component 34 in a direction opposite to the rotation direction of the main shafts.

Thereafter, the controller 50 synchronizes rotation of the holding component 34 with rotation of the main shafts again in the vicinity on a downstream side along the rotation direction of the main shafts, of the bridge portion 18*a* (synchronization starting position R4 in FIG. 12E), and then moves the holding component 34 to the wire pushing position P3 for the next rotation following a completed rotation of the segment core 12. The rotational speed of the holding component 34 in the opposite direction may be a speed at which the holding component 34 can be placed to stand-by at the synchronization starting position until a timing earlier than a timing at which the holding component 34 passes the bridge portion 18*a* if it is assumed that the synchronization between rotation of the holding component 34 and rotation of the main shafts is not released. If this condition is satisfied, the rotational speed of the holding component 34 may be faster or slower than rotation of the main shafts, or may be the same speed as rotation of the main shafts (differ only in rotation direction). Since the rotation angle from the first retracted position P1 to the bridge portion 18*a* is shorter along the opposite direction (counterclockwise direction) than along the same rotation direction as the main shafts, the above condition can be satisfied even at a rotation speed slower than the rotation speed of the main shafts.

Specifically, after rotating the holding component 34 in a direction opposite to the rotation direction of the main shafts, the controller 50 synchronizes rotation of the holding component 34 with rotation of the main shafts at the synchronization starting position R4. Further, at an appropriate timing after the synchronization starts, the controller 50 performs a control to shift the holding component 34 from the first retracted position P1 to the wire pushable position P2 and then move the holding component 34 to the wire pushing position P3 for the next rotation following the completed rotation.

Figure 12D:
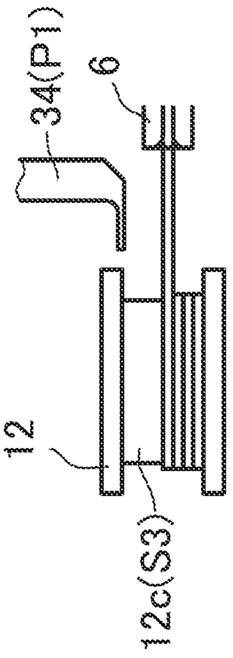

In this operation pattern, since interference with the bridge portion 18*a* does not occur during rotation of the holding component 34, the holding component 34 can be rotated while being positioned at the first retracted position P1 as shown in FIG. 12D (the surface S3 of the winding shaft 12*c* appears in FIG. 12D) with no problem. That is, it is not necessary to retract the holding component 34 to the second retracted position P4 as in the example of FIG. 7A to FIG. 7E or the example of FIG. 10A to FIG. 10E.

Figure 12E:
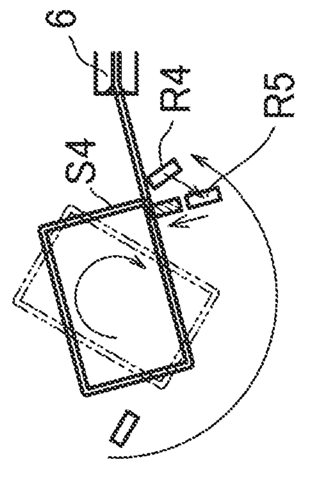

Therefore, it is necessary to merely move the holding component 34 by a short distance from the first retracted position P1 to the wire pushing position P3 via the wire pushable position P2 while the segment core 12 is rotated from R4 to R5 of FIG. 12E which corresponds to the rotation from R2 to R3 of FIG. 7E. Accordingly, it is possible to appropriately control the movement of the holding component 34, even if the segment core 12 is rotated faster. Therefore, it is possible to reduce the winding operation time.

Note that, even if the holding component 34 is retracted to the second retracted position P4 in the second asynchronous rotational operation pattern, the winding itself can be performed with no problem.

[Second Asynchronous Rotational Operation Pattern (Downward Winding): FIG. 13A to FIG. 13E]

Next, referring to FIG. 13A to FIG. 13E, winding operation during downward winding according to second asynchronous rotational operation pattern will be described.

FIG. 13A to FIG. 13E are a series of views showing winding operation (downward winding) according to the second asynchronous rotational operation pattern by the upper winding apparatus 2A of the winding apparatus 2.

FIG. 13A to FIG. 13E show the winding operation of the second layer as an exemplary operation of downward winding according to the second asynchronous rotational operation pattern. This winding operation differs only in the winding direction and the like as compared with the winding operation of the upward winding described with reference to FIG. 12A to FIG. 12E. Therefore, portions same as those in the upward winding will be omitted as appropriate.

Figure 13A:
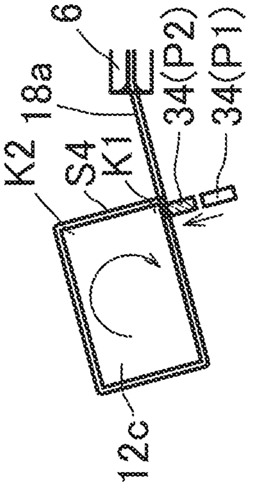
FIG. 13A to FIG. 13E are a series of views showing a winding operation (downward winding) according to the second asynchronous rotational operation pattern by the upper winding apparatus of the winding apparatus shown in FIG. 1. Each of FIG. 13A to FIG. 13E shows a state corresponding to each of FIG. 9A to FIG. 9E.
Figure 13B:
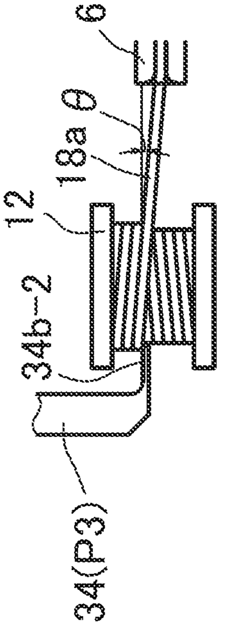
Figure 13C:
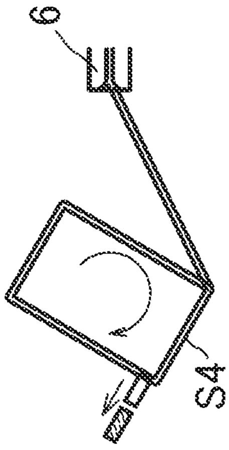
Figure 13D:
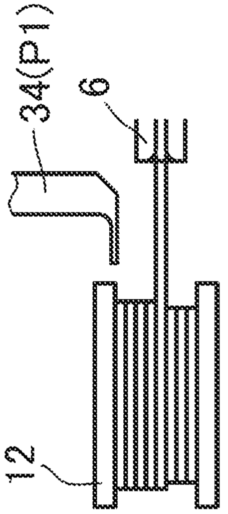
Figure 13E:
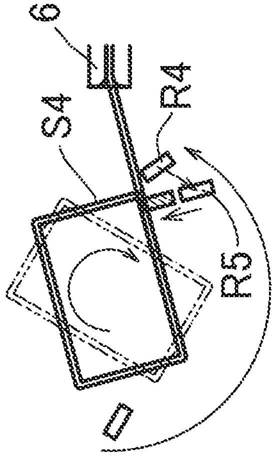

The difference from the upward winding is that, as shown in FIG. 13B, the diagonal winding is performed by displacing the nozzle 6, through control of the nozzle displacement structure 74 by the controller 50, to a lower position than that for winding on surfaces not performing diagonal winding thereon so that the flat wire 18 has an angle θ required for the diagonal winding. Further, it is also different that the holding component 34 pushes the lower surface of the flat wire 18 by the surface 34*b*-2 opposite to the one used in the case shown in FIG. 12B (the upper side surface in the figure) of the distal end portion of the pushing piece 34*b*.

[Modification Example of the Second Asynchronous Rotational Operation Pattern: FIG. 14A to FIG. 14H]

Next, referring to FIG. 14A to FIG. 14H, a modification example of the second asynchronous rotational operation pattern will be described.

FIG. 14A to FIG. 14H are a series of views showing a winding operation according to the modification example of the second asynchronous rotational operation pattern by the upper winding apparatus 2A of the winding apparatus 2. Portions same as those in the winding operation according to the second asynchronous rotational operation pattern described with reference to FIG. 12A to FIG. 13E will be omitted as appropriate.

Figures 14A, 14B, 14C, 14D, 14E, 14F, 14G, 14H:
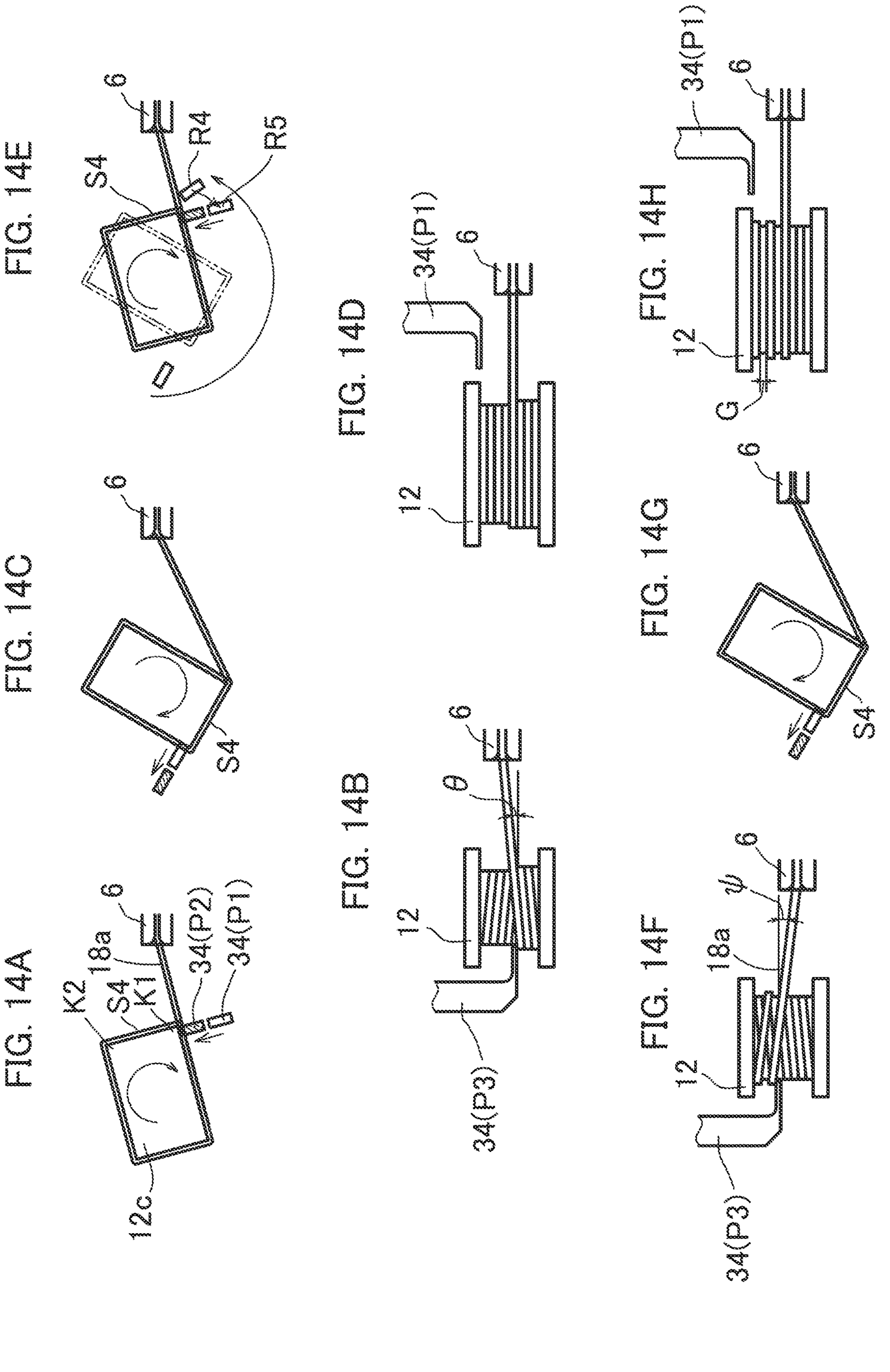
FIG. 14A to FIG. 14H are a series of views showing a modification example of the winding operation according to the second asynchronous rotational operation pattern. Each of FIG. 14A to FIG. 14E shows a state corresponding to each of FIG. 12A to FIG. 12E.

FIG. 14A to FIG. 14H show the winding operation of the N-th layer (upward winding) and the (N+1)—the layer (downward operation) as an exemplary operation of the modification example of the second asynchronous rotational operation pattern. N is a natural number. FIG. 14A to FIG. 14E show the operation during the upward winding, and FIG. 14F to FIG. 14H show the operation during the downward winding.

In this modification example, the operation during the upward winding is the same as that according to the second asynchronous rotational operation pattern. On the other hand, the operation during the downward winding is different from the operation according to the second asynchronous rotational operation pattern in that positions of the wires in the axial direction at the starting point and ending point of the winding on the surface S4 on which the diagonal winding is performed differ from each other by an amount larger than the width of the flat wire 18, and as a result a gap is formed between neighboring rows of the flat wire 18 (such winding method is referred to as "jump" here).

That is, the operation shown in FIG. 14A to FIG. 14E are substantially the same as the operation shown in FIG. 12A to FIG. 12E. Further, the operation shown in FIG. 14F to FIG. 14H corresponds to the operation shown in FIG. 13A to FIG. 13E, but differs in that the downward displacement amount of the nozzle 6 in FIG. 14F compared with the position for winding on the surfaces S1 to S3 not performing diagonal winding thereon is larger than that in the case of FIG. 13B. Therefore, the inclination w of the flat wire 18 is larger than 0 in FIG. 13B. Further, as shown in FIG. 14H, a gap G is formed between neighboring rows of the flat wire 18 in the rows in which the jump was performed. Even in this case, by performing the diagonal winding while pushing the flat wire 18 to the wound wire side by the r 34, as in the case of the second asynchronous rotational operation pattern, the positional deviation of the flat wire 18 can be prevented using only one holding component 34, and the problem of winding deterioration can be solved.

When the segment core 12 is annularly assembled in the stator, since the outer diameter side thereof has a larger margin for winding, if the winding is uniformly performed in the axial direction around the winding shaft 12*c* in accordance with the space on the inner diameter side, the winding will leave a wasteful space on the outer diameter side. Therefore, for example, by performing the above-described jump on the inner diameter side, it is possible to design a winding with a higher degree of freedom, such as winding more wires on the outer diameter side.

Of course, it is not necessary to perform the jump at full axial length. It is not necessary to do it in all layers. The size of the gap between neighboring rows of the flat wire 18 is arbitrary (for example, one or two times the width of the flat wire 18 is conceivable, but not limited to integer multiples), and may be different depending on positions in the axial direction or depending on layers. Further, the jump may be performed during the upward winding.

In addition, the above-described jump may be performed in the above-described synchronized rotational operation pattern or the first asynchronous rotational operation pattern.

Figure 15:
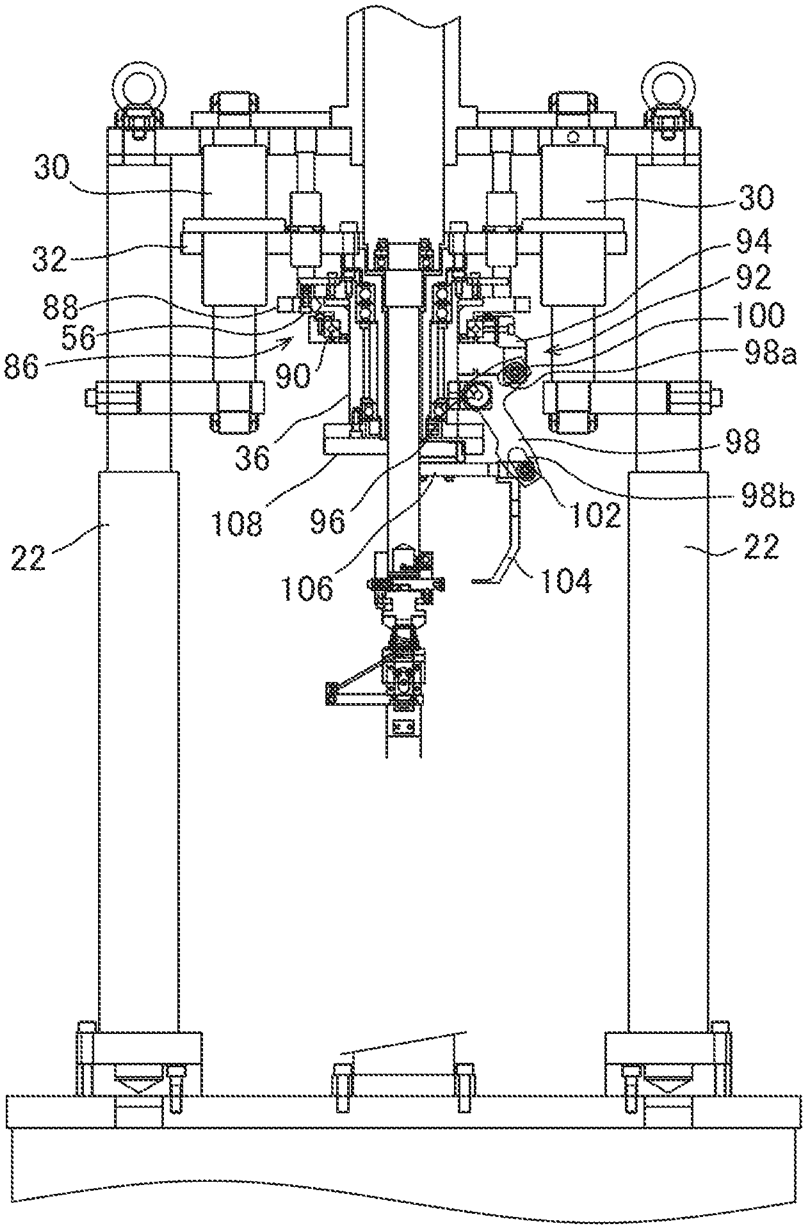
FIG. 15 is a front view showing a modification example of a radial movement structure of the upper winding apparatus.

[Modification Example of the Winding Apparatus: FIG. 15]

Next, referring to FIG. 15, a modification example of the radial movement structure 68 of the upper winding apparatus 2A of the winding apparatus 2 will be described.

FIG. 15 is a front view illustrating a configuration of the modification example of the radial movement structure 68. In FIG. 15, the same reference numerals are used for portions common to the configurations illustrated in FIG. 1 to FIG. 4.

The radial movement structure 68 in the configuration shown in FIG. 1 to FIG. 4 and the like has a configuration in which the holding component 34 is moved in the radial direction (front-rear direction) of the winding shaft 12*c* by a rack-and-pinion structure, and this modification example has a configuration in which a link structure is used.

In FIG. 15, a ring unit 86 is disposed on the upper end side of the holding unit 36 and fitted thereto. The ring unit 86 includes a base ring 88 connected to the ball screw structure 56 and movable in the up-down direction independently of the holding unit 36, and a radial bearing 90 coupled to the base ring 88. A link structure 92 connected to the radial bearing 90 is provided integrally with the holding unit 36.

The link structure 92 includes a first link 94 connected to the radial bearing 90 and an L-shaped second link 98 rotatably supported by the shaft 96. One end of the second link 98 is connected to the first link 94 by a cam follower 100 via a long through-hole 98*a*. The other end of the second link 98 is connected to a slider 106 integral with the holding component 104 by a cam follower 102 via a long through-hole 98*b*.

The slider 106 is fitted to the rail component 108 fixed to the lower end of the holding unit 36 to constitute a linear guide structure, and is slidable in the axial direction of the rail component 108.

When the movable part 56*a* of the ball screw structure 56 moves downward, the first link 94 is pushed downward, so that the holding component 104 moves to the left side in the radial direction in the figure, and when the movable part 56*a* moves upward, the first link 94 is pulled upward, so that the holding component 104 moves to the right side in the radial direction in the figure.

The radial movement structure using the link structure shown in FIG. can be similarly implemented in the radial movement structure 68B of the lower winding apparatus 2B.

Figure 16A:
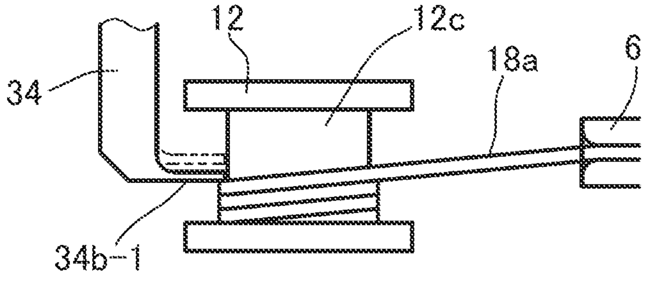
FIG. 16A to FIG. 16C are views for explaining selective use of the holding component of the upper winding apparatus and a holding component of a lower winding apparatus.
Figure 16B:
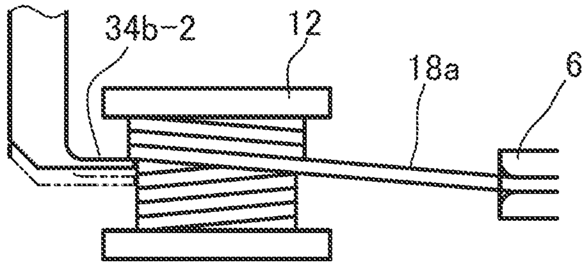
Figure 16C:
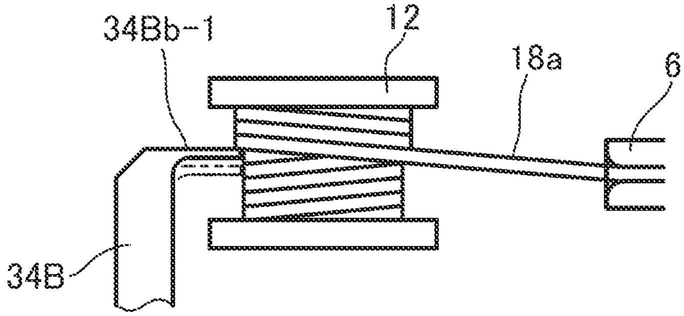

[Selective Use of the Holding Component 34 and the Holding Component 34B: FIG. 16A to FIG. 16C]

Next, referring to explanatory views of FIG. 16A to FIG. 16C, selective alternate use of the holding component 34 provided in the upper winding apparatus 2A and the holding component 34B provided in the lower winding apparatus 2B for each layer (for each of the upward winding and the downward winding) of the wire to be spirally wound around the winding shaft 12*c* will be described.

When using the holding component 34 provided in the upper winding apparatus 2A, as shown in FIG. 16A, the flat wire 18 is pushed by the lower surface 34*b*-1 of the pushing piece of the holding component 34 of the upper winding apparatus 2A during the upward winding as described with reference to FIG. 7B and the like. Accordingly, when retracting the holding component 34 by merely shifting it in the axial direction of the winding shaft 12*c*, it is possible to avoid interference between the holding component 34 and the bridge portion 18*a* only by shifting the holding component 34 upward by slightly larger amount than the thickness of the wire as shown by a chain double-dashed line.

However, during the downward winding, since the flat wire 18 is pushed by the upper surface 34*b*-2 of the pushing piece as described with reference to FIG. 9B and the like, even if the holding component 34 is shifted downward in the axial direction, the main body 34*a* interferes with the bridge portion 18*a* as shown by a chain double-dashed line in FIG. 16B. Therefore, since it is necessary to retract the holding component 34 to the second retracted position P4, the moving path for the retracting and returning to the pushing position becomes long, and it takes a long time to move.

On the other hand, if the holding component 34B of the lower winding apparatus 2B is used during the downward winding as shown in FIG. 16C, it is possible to avoid interference between the holding component 34B and the bridge portion 18*a* only by shifting the holding component 34B downward by slightly larger amount than the thickness of the wire as shown by a chain double-dashed line similarly to the case shown in FIG. 16A.

Thus, by selectively using the holding component 34 of the upper winding apparatus 2A and the holding component 34B of the lower winding apparatus 2B for each layer of the wire wound around the winding shaft 12*c* depending on whether the winding is the upward winding or the downward winding, the retracting operation of each holding component 34, 34B can be performed by the requisite minimum displacement, thereby contributing to improvement of efficiency of the winding operation.

Further, when the wire is wound upward at the same tilt angle in the diagonal winding, a problem occurs that the wire interferes with the flange 12*d* in the vicinity of the upper end. This problem can be solved by reducing the tilt angle so that the wire does not interfere with the flange 12*d*, and pushing up the ending point side by the lower holding component 34B while pressing the starting point side by the upper holding component 34. The same can be applied to the downward winding. As described here, by simultaneously using the upper and lower holding components 34 and 34B, it is possible to alleviate the difficulty of winding at the upper and lower end portions.

As described above, in the present embodiment, the holding component is provided to be rotatable around the axis of the main shaft and movable in the axial direction and the radial direction of the winding shaft, the diagonal winding is performed in a state where the holding component pushes the wire to the wound wire side, and the pushing by the holding component is released at a timing when the wire is would on the wind ending position side corner of the surface on which the diagonal winding is performed. Accordingly, even when the wire is helically wound around the winding shaft using the diagonal winding, it is possible to alleviate defects in the winding with a simple configuration having one holding component.

In addition, by adopting a configuration in which synchronization between rotation of the holding component and rotation of the main shafts is released and the holding component is rotated faster after releasing the pushing, the time of the winding operation can be reduced. Further, since the holding components 34, 34B can be placed at arbitrary positions while they do not push the wire, various driving patterns can be performed by one holding component. For example, higher degree of freedom can be obtained in terms of whether rotation of the holding component is in the same direction as or opposite to rotation of the winding shaft, or how much speed the rotation is.

Other Modifications

Further, in the above embodiment, the winding apparatus 2 of the twin configuration including the upper winding apparatus 2A and the lower winding apparatus 2B has been exemplified, but it is conceivable that the winding apparatus included only one of them. Further, in the above-described embodiment, rotation of the holding component is synchronized with rotation of the main shafts through control of the servo motor by the controller 50, but if it is not necessary to release the synchronization, it is conceivable that the holding unit is fixed to the main shaft so that the holding component rotates integrally with the main shaft. Furthermore, although a flat wire having a rectangular cross section is used as the wire, the above-described effects can be obtained even if a wire having a polygonal cross section other than the rectangular one, or a round wire is adopted. In the case of the flat wire which is prone to be displaced during the diagonal winding, the effect is particularly great.

Further, an object of the winding according to the present invention is not limited to the winding shaft of the segment core of the stator as in the above-described embodiment, and of course, it may be any winding shaft.

The shape of the winding shaft is not limited to a shape having a rectangular cross section like the winding shaft 12*c*, and may be a shape having any polygonal cross section. Of course, it is not necessary that the angles formed by the surfaces on both sides of the corner are right angles. All or a part of the side surfaces of the winding shaft 12*c* may be a curved surface. No matter what shape the side surfaces of the winding shaft are, if an area among the side surfaces of the winding shaft on which the diagonal winding is performed is an area sandwiched between two corners, the same effect as in the embodiment described above can be obtained. Furthermore, as long as it is possible to obtain a frictional force between the wire and the corner to an extent that positional deviation of the wire in the axial direction of the winding shaft hardly occurs, the corner may be somewhat rounded.

Preferred embodiments of the present invention are described above. However, the present invention is not limited to such specific embodiments, and various modifications and variations are conceivable. The above-described configurations of the present invention can be implemented by extracting only a part thereof, and the variations described in the above explanation can be applied in any combination as long as they do not conflict with each other. The effects described in the embodiments of the present invention are merely examples of effects obtained by the embodiments, and the effects of the present invention are not limited to those described in the embodiments of the present invention.

REFERENCE SIGNS LIST

2 winding apparatus
2A upper winding apparatus
2B lower winding apparatus
6 nozzle
8, 10 main shafts
12 segment core
12*c* winding shaft
34, 34B holding component
34*a* main body
34*b* pushing piece
34*b*-1 lower surface of distal end portion of pushing piece
34*b*-2 upper surface of distal end portion of pushing piece
42, 42B axial movement structures
50 controller
52, 52B synchronized rotation structures
67, 67B holding component moving structures
68, 68B radial movement structures
74 nozzle movement structure
80 main shaft drive structure
K1 corner that is a starting point of diagonal winding
K2 corner that is an ending point of diagonal winding

The invention claimed is:

1. A winding apparatus, comprising:

a wire supply port that supplies a wire to be wound around a winding shaft having two or more corners on a side surface thereof;

a main shaft drive structure that rotates the winding shaft;

a holding component movable at least in an axial direction of the winding shaft and rotatable around an axis of the winding shaft;

a moving structure that moves the holding component at least in the axial direction of the winding shaft;

a rotation structure that rotates the holding component around the axis of the winding shaft; and a controller configured to control the moving structure, the rotation structure, and the main shaft drive structure such that, for each rotation of the winding shaft:

during diagonal winding of the wire in a first region between two of the corners, the diagonal winding being winding in which axial positions of the wire at a starting point and an ending point of the diagonal winding in the first region are different, the holding component pushes the wire toward a wound wire side in the vicinity of a starting-point-side corner of the first region, and the rotation structure rotates the holding component in synchronization with rotation of the winding shaft;

after the wire is wound around an ending-point-side corner of the first region, the moving structure moves the holding component to release the pushing by the holding component; and thereafter, the moving structure and the rotation structure position the holding component in the vicinity of the starting-point-side corner of the first region before diagonal winding of a next rotation is started.

2. The winding apparatus according to claim 1, wherein the moving structure comprises:

an axial movement structure that moves the holding component in the axial direction of the winding shaft; and a radial movement structure that moves the holding component in a radial direction of the winding shaft.

3. The winding apparatus according to claim 1, wherein the controller is further configured to control the moving structure, the rotation structure, and the main shaft drive structure such that:

after the pushing by the holding component is released, the rotation structure continues to rotate the holding component in the same direction as the rotation of the winding shaft;

before the holding component reaches a bridge portion of the wire located between the winding shaft and the wire supply port, the moving structure retracts the holding component to prevent the holding component from interfering with the bridge portion; and after the holding component passes the bridge portion, the moving structure and the rotation structure position the holding component at a position for pushing the wire in the next rotation.

4. The winding apparatus according to claim 3, wherein the controller is further configured to control the moving structure, the rotation structure, and the main shaft drive structure such that:

after the holding component is retracted, the rotation structure rotates the holding component in the same direction as the rotation of the winding shaft at a higher speed than that of the winding shaft; and after the holding component passes the bridge portion, the rotation structure rotates the holding component in synchronization with the rotation of the winding shaft.

5. The winding apparatus according to claim 3, further comprising:

two main shafts arranged concentrically and in opposition to each other, the two main shafts being arranged to hold the winding shaft therebetween, wherein:

the holding component comprises two holding components respectively corresponding to the two main shafts;

the moving structure comprises two moving structures respectively corresponding to the two holding components;

the rotation structure comprises two rotation structures respectively corresponding to the two holding components; and the controller is further configured to, for each layer of the wire helically wound around the winding shaft, select one of the two holding component for which the retraction of the holding component requires a smaller movement of the holding component, and control the moving structure and the rotation structure corresponding to the selected holding component such that the selected holding component pushes the wire toward the wound wire side.

6. The winding apparatus according to claim 1, wherein the controller is further configured to control the moving structure, the rotation structure, and the main shaft drive structure such that:

after the pushing by the holding component is released, the moving structure retracts the holding component to prevent the holding component from interfering with the rotating winding shaft;

the rotation structure thereafter rotates the holding component in a direction opposite to the rotation direction of the winding shaft;

in the vicinity of a bridge portion of the wire located between the winding shaft and the wire supply port and on a downstream side of the bridge portion in the rotation direction of the winding shaft, the rotation structure synchronizes the rotation of the holding component with the rotation of the winding shaft; and the moving structure and the rotation structure thereafter position the holding component at a position for pushing the wire in the next rotation.

7. The winding apparatus according to claim 1, wherein the holding component comprises:

a main body extending in a rotational-axis direction of the winding shaft; and a pushing piece projecting in a radial direction of the winding shaft from a distal end of the main body, wherein the holding component pushes the wire toward the wound wire side with a surface of a tip of the pushing piece on a distal-end side of the main body.

* * * * *